US009127165B2

(12) United States Patent
Grüner et al.

(10) Patent No.: US 9,127,165 B2
(45) Date of Patent: Sep. 8, 2015

(54) PLATE-SHAPED EFFECT PIGMENT COMPRISING A COPPER-CONTAINING COATING, METHOD FOR THE PRODUCTION THEREOF, AND USE THEREOF

(71) Applicant: Eckart GmbH, Hartenstein (DE)

(72) Inventors: Michael Grüner, Auerbach (DE); Günter Kaupp, Neuhaus (DE); Thomas Voit, Auerbach (DE); Dirk Schumacher, Pegnitz (DE); Andreas Gipp, Nuremberg (DE)

(73) Assignee: ECKART GMBH, Hartenstein (DE)

( * ) Notice: Subject to any disclaimer, the term of this patent is extended or adjusted under 35 U.S.C. 154(b) by 0 days.

(21) Appl. No.: 14/397,747

(22) PCT Filed: Apr. 30, 2013

(86) PCT No.: PCT/EP2013/059019
§ 371 (c)(1),
(2) Date: Oct. 29, 2014

(87) PCT Pub. No.: WO2013/164352
PCT Pub. Date: Nov. 7, 2013

(65) Prior Publication Data
US 2015/0122146 A1    May 7, 2015

(30) Foreign Application Priority Data

May 3, 2012 (DE) .......................... 10 2012 103 903

(51) Int. Cl.
C09C 1/00     (2006.01)
C09D 5/16     (2006.01)
C09D 5/36     (2006.01)
C09D 7/12     (2006.01)

(52) U.S. Cl.
CPC ............ C09C 1/0021 (2013.01); C09D 5/1618 (2013.01); C09D 5/1687 (2013.01); C09D 5/36 (2013.01); C09D 7/1283 (2013.01); *C01P 2004/20* (2013.01); *C01P 2004/51* (2013.01); *C01P 2004/54* (2013.01); *C01P 2006/12* (2013.01); *C01P 2006/62* (2013.01); *C09C 2200/102* (2013.01); *C09C 2200/1004* (2013.01); *C09C 2220/10* (2013.01); *C09C 2220/106* (2013.01)

(58) Field of Classification Search
CPC ...... C09D 5/1618; C09D 5/1687; C09D 5/36; C09D 7/1283; C09C 1/0021; C09C 2200/10; C09C 2200/102; C09C 2200/106; C09C 2200/1004; C01P 2004/20; C01P 2004/51; C01P 2004/54; C01P 2006/12; C01P 2006/62
USPC .......................................... 106/404, 415, 417
See application file for complete search history.

(56) References Cited

U.S. PATENT DOCUMENTS

| 3,087,828 | A | * | 4/1963 | Linton ........................... 106/417 |
| 4,551,491 | A | * | 11/1985 | Panush ............................. 524/31 |
| 5,116,664 | A | * | 5/1992 | Kimura et al. ................ 428/216 |
| 5,131,952 | A |   | 7/1992 | Hayashi et al. |
| 5,266,107 | A | * | 11/1993 | Hoffman ....................... 106/415 |
| 6,139,615 | A | * | 10/2000 | Jones ............................ 106/418 |
| 6,440,208 | B1 |   | 8/2002 | Christie et al. |
| 6,582,764 | B2 | * | 6/2003 | Fuller et al. .................... 427/217 |
| 6,616,745 | B1 |   | 9/2003 | Narvarti et al. |
| 7,147,921 | B2 |   | 12/2006 | Camp et al. |
| 7,842,130 | B2 | * | 11/2010 | Zimmermann et al. ...... 106/415 |
| 2004/0197322 | A1 |   | 10/2004 | Camp et al. |
| 2005/0204958 | A1 |   | 9/2005 | Kuebelbeck et al. |
| 2009/0320719 | A1 | * | 12/2009 | Lee et al. ....................... 106/404 |

FOREIGN PATENT DOCUMENTS

| DE | 10209359 A1 | 9/2003 |
| EP | 0415477 A2 | 3/1991 |
| EP | 0427858 A1 | 5/1991 |
| EP | 0677989 B1 | 9/1998 |
| EP | 1479730 A1 | 11/2004 |
| EP | 2246395 A1 | 11/2010 |
| FR | 2937043 A1 | 4/2010 |
| JP | 54047730 A | 4/1979 |
| JP | 61258875 A | 11/1986 |
| JP | 1213368 A | 8/1989 |
| JP | 2011042559 A | 3/2011 |
| WO | 9415462 A1 | 7/1994 |
| WO | 0160628 A2 | 8/2001 |
| WO | 2004007624 A1 | 1/2004 |
| WO | 2004092283 A2 | 10/2004 |
| WO | 2010125323 A1 | 11/2010 |
| WO | 2011010663 A1 | 1/2011 |

OTHER PUBLICATIONS

Katscher, R. et al., Vorstudie zum Bewuchsschutz für Seeschiffe, Jan. 1999, Part 2, pp. 2, 3, 5, 6, and 11.
Watermann, B.T. et al., Einsatz von Nanomaterialien als Alternative zu biozidhaltigen Antifouling-Anstrichen und deren Umweltauswirkungen, Umweltbundesamt Texte 40/2010, Forderkennzeichen: 363 01174, UBA-FB 001301, pp. 14, 19, 23, 24, 29, and 53-54.
Yebra, D. M. et al., Antifouling technology—past, present and future steps towards efficient and invironmentall friendly antifouling coatings, Progress in Organic Coatings 50 (2004), pp. 75-104.

* cited by examiner

*Primary Examiner* — Anthony J Green

(74) *Attorney, Agent, or Firm* — The Webb Law Firm

(57) ABSTRACT

The present invention relates to an effect pigment comprising a plate-shaped non-metallic substrate and at least one copper-containing coating, wherein the average particle size $D_{50}$ of the effect pigment is more than 5 μm and the copper content of the effect pigment is in a range from 3 to 70 wt.-%, relative to the total weight of the effect pigment. The invention furthermore relates to a method for producing the latter and use of the effect pigment in anti-fouling coatings.

19 Claims, No Drawings

PLATE-SHAPED EFFECT PIGMENT COMPRISING A COPPER-CONTAINING COATING, METHOD FOR THE PRODUCTION THEREOF, AND USE THEREOF

CROSS-REFERENCE TO RELATED APPLICATIONS

This application is the national phase of PCT/EP2013/059019 filed Apr. 30, 2013, and claims priority to German Patent Application No. 10 2012 103 903.8 filed May 3, 2012, the disclosures of which are hereby incorporated in their entirety by reference.

BACKGROUND OF THE INVENTION

1. Field of the Invention

The present invention relates to an effect pigment comprising a plate-shaped non-metallic substrate and a copper-containing coating, to a method for the production thereof and to the use of this effect pigment in anti-fouling coatings. The invention furthermore relates to anti-fouling coatings comprising such an effect pigment.

2. Description of Related Art

Underwater coatings consist predominantly of a waterproof coating (corrosion protection, osmosis protection, protection against mechanical damage) and a fouling-inhibiting coating as paint finish. This fouling-inhibiting coating, by continuous washing out of biocides, is to prevent fouling organisms such as algae, fungi, snails, mussels and further microorganisms, the so-called fouling, from attaching themselves to a ship's hull for example. Fouling organisms increase the frictional resistance and the weight of a ship. They thus contribute to an increased fuel consumption and thereby to increased operating costs. The biocides only act when they are released from the paint into the seawater ("leaching"). If this is not the case, they are not absorbed by the organisms and cannot deploy their biocidal effect. The integration of the biocides in the paint thus must represent a compromise between a washout of the biocides that is too fast and a discharge into the seawater that is too slight. In other words, the cost-intensive renewal of the paint is to be minimized and at the same time the protection against fouling is to be maintained. Some of the biocide-containing anti-fouling systems predominantly used until now have, in the past, caused damage worldwide in the marine environment, with the result that particular biocides, such as e.g. dichlorodiphenyltrichloroethane (DDT), organotin, arsenic and mercury compounds, have been banned internationally. As a response to the environmental problem of biocide-containing anti-fouling systems, biocide-free non-stick coatings, predominantly based on silicone, were brought onto the market. As an example so-called sharkskin is to be named here, which consists of nanostructured silicone with irregular, but regularly repeating topography. The beneficial claim of products based on sharkskin, however, is only conditionally correct, as sharkskin is covered with special scales which clean each other by the constant movements of the sharks and fouling is not repelled just by the roughness. An ideal surface structure which similarly prevents all fouling organisms from settling has thus far not yet been able to be identified (B. T. Watermann, D. Daehne, C. Fürle, Einsatz von Nanomaterialien als Alternative zu biozidhaltigen Antifouling-Anstrichen und deren Umweltauswirkungen, Umweltbundesamt Texte 40/2010, UBA-FB No.: 001301, funding reference number: 363 01 174, pp. 14, 19, 23, 24 (hereafter called "Umweltbundesamt"); R. Kätscher, J. Ranke, M. Bergenthal, J. Warrelmann, Vorstudie zum Bewuchsschutz für Seeschiffe, January 1999, $2^{nd}$ part p. 5, (hereafter called "Vorstudie")).

Anti-microbial compositions and polymers containing these anti-microbial compositions are known from EP 0 677 989 B1. The anti-microbial compositions comprise inorganic particles which have a primary surface coating made of a metal or a metal compound with anti-microbial properties and are covered with a secondary protective layer. This primary coating has a proportion by weight of from 0.05 to 20 wt.-% relative to the substrate. The secondary protective layer is to influence the release of the anti-microbial component into the surrounding polymer matrix.

Anti-bacterial or electrically conductive compositions containing inorganic particles coated with metals are described in EP 0 427 858 A1. If the particles are to have an anti-bacterial effect, the proportion of the coating is 0.1 to 20 wt.-%, relative to the total weight of the particles. If the particles are to be electrically conductive, the proportion of the coating is at least 25 wt.-%, relative to the inorganic particles. The average size of the particles is between 0.1 and 5 μm. With such small particle sizes, only an insufficient barrier effect is guaranteed. Furthermore, the specific surface area, i.e. the surface area per unit of weight, of these particles is disadvantageously very large, with the result that a high release rate of the anti-bacterial component is brought about.

Anti-microbial pigments comprising a mixture of inorganic pigment and silver oxide as anti-microbial component are known from WO 2004/092283 A2. The silver oxide can be replaced by other anti-microbial compounds. The anti-microbial compound content lies in a range of from 0.001 to 10 wt.-%, preferably from 0.005 to 5 wt.-%, in each case relative to the inorganic pigment. The inorganic pigment can have any desired shape.

The use of copper platelets coated with silicon dioxide in anti-fouling coatings which are commercially available as Resist AT, LT or CT (from Eckart) is known from U.S. Pat. No. 7,147,921 B2.

Copper-containing anti-fouling coatings in which the amount of copper has been reduced by addition of graphite are known from US 2004/0197322 A1.

A predominantly spherical powder which has been covered with copper(I) oxide by means of electrolysis is described in EP 2 246 395 A1. The copper(I) oxide particles are adhesively fixed to the surface. The proportion of water-soluble chloride ions is less than 0.1 wt.-% relative to the total weight of the powder. The powders are to be able to be incorporated well into anti-fouling coatings and at the same time increase their storage stability.

WO 2011/010663 A1 describes particles that are covered with copper(I) oxide by means of electrolysis and which can be used to increase the storage stability in anti-fouling coatings. The copper(I) oxide covering here consists of an accumulation of octahedral copper(I) oxide particles.

Composite pigments for anti-fouling coatings in which copper(I) oxide particles are electrolytically deposited on the surface of SiO2 and/or Al2O3 powder are described in JP 01213368 A.

According to FR 2 937 043 A1 pearlescent pigments are used in anti-fouling coatings to attract fish. The organisms settling on a ship's hull are to serve as food for the fish.

At the same time, the pearlescent pigments are to give the anti-fouling coating a visually attractive appearance.

Biocidal compositions comprising an inorganic silver, copper or zinc compound as well as an polymeric carrier are known from WO 2010/125323 A1. The copper compound can be selected for example from basic copper chloride, basic copper sulfate, basic copper carbonate, copper oxide or copper hydroxide. Disadvantageously, coated organic carrier materials are as a rule only conditionally temperature-stable. When used in solvent-containing systems, undesired phenomena such as swelling or even complete disintegration of the carrier material can also occur.

Anti-fouling coatings are known from JP 54047730 A which comprise for example basic copper chloride and red phosphorus, which is responsible for the controlled washout of copper ions.

SUMMARY OF THE INVENTION

In some non-limiting embodiments, there is provided an effect pigment comprising a plate-shaped non-metallic substrate and at least one copper-containing coating, wherein the average particle size $D_{50}$ of the effect pigment is more than 5 μm and the copper content of the effect pigment is in a range of from 3 to 70 wt.-%, relative to the total weight of the effect pigment.

In some non-limiting embodiments, a method for producing an effect pigment comprises: (a1) suspending plate-shaped non-metallic substrate in an aqueous solution, (b1) adding a copper salt solution and depositing a copper-containing coating on the plate-shaped non-metallic substrate, to obtain the effect pigment, (c1) filtering, optionally drying and/or optionally calcining the effect pigment obtained according to step (b1).

In some non-limiting embodiments, a method for producing an effect pigment comprises: (a2) bringing an aqueous copper salt solution and a plate-shaped non-metallic substrate into contact, to provide a suspension, (b2) adding a copper complexing agent to the suspension obtained in step (a2), (c2) adding a reducing agent to the suspension from step (b2), to obtain the effect pigment, (d2) filtering, optionally drying and/or optionally calcining the effect pigment obtained according to step (c2).

DETAILED DESCRIPTION

The object of the present invention is to provide an anti-fouling component for anti-fouling coatings, which is characterized at the same time by a fouling-inhibiting effect and an active barrier protection. The anti-fouling component is to be characterized by its lower proportion acting as biocide compared with conventionally used biocides, and is still to have a sufficient action in anti-fouling coatings that inhibits the fouling in the long term. Furthermore, an anti-fouling component that can be adapted to the individual needs of the respective anti-fouling coating is to be available. The anti-fouling component is additionally to be able to be incorporated easily into the anti-fouling coatings. Moreover, anti-fouling coatings with fouling-inhibiting properties and at the same time active barrier protection are to be provided.

The object is achieved by the provision of an effect pigment comprising a plate-shaped non-metallic substrate and at least one copper-containing coating, wherein the average particle size $D_{50}$ of the effect pigment is more than 5 μm and the copper content of the effect pigment is in a range of from 3 to 70 wt.-%, relative to the total weight of the effect pigment.

In addition, the object is achieved by the provision of a method for producing an effect pigment according to the invention, wherein the method comprises the following steps:
(a1) suspending plate-shaped non-metallic substrate in an aqueous solution,
(b1) adding a copper salt solution and depositing a copper-containing coating on the plate-shaped non-metallic substrate, to obtain the effect pigment,
(c1) filtering, optionally drying and/or optionally calcining the effect pigment obtained according to step (b1)
or
wherein the method comprises the following steps:
(a2) bringing an aqueous copper salt solution and a plate-shaped non-metallic substrate into contact, to provide a suspension,
(b2) adding a copper complexing agent to the suspension obtained in step (a2),
(c2) adding a reducing agent to the suspension from step (b2), to obtain the effect pigment,
(d2) filtering, optionally drying and/or optionally calcining the effect pigment obtained according to step (c2).

According to a preferred development of the method according to the invention, a Rochelle salt solution, thus a potassium sodium tartrate solution, is used as copper complexing agent in step (b2) in the second method variant.

According to a further variant of the invention, diethylenetriaminepentaacetic acid, ethylenediaminetetraacetic acid calcium disodium salt dihydrate, ethylenediaminetetraacetic acid dipotassium salt dihydrate, ethylenediaminetetraacetic acid magnesium dipotassium salt, ethylenediaminetetraacetic acid disodium salt dihydrate, ethylenediaminetetraacetic acid, nitrilotriacetic acid, ethylenediamine disuccinic acid, ethylene glycol-bis(aminoethylether)-N,N,N',N'-tetraacetic acid, N,N-dimethylethanolamine, diethylamine, triethylamine, dimethylamine, n-butylamine, i-butylamine and/or mixtures thereof can also be used as copper complexing agent.

Any suitable copper reducing agent can be used as reducing agent in step (c2) in the second method variant. For example, reducing sugars such as glucose, fructose, galactose, maltose and lactose or alkanals have proved to be suitable.

Furthermore, the object is achieved by the provision of an anti-fouling coating comprising an effect pigment according to the present invention, as well as by the use of an effect pigment according to the present invention in an anti-fouling coating.

The plate-shaped non-metallic substrate of the effect pigment according to the invention can be selected from the group consisting of natural mica platelets, synthetic mica platelets, glass platelets, SiO2 platelets, Al2O3 platelets, BiOCl platelets, TiO2 platelets, Fe2O3 platelets, sericite platelets, kaolin platelets, graphite platelets, plate-shaped substrates which comprise an inorganic-organic mixed layer. Preferably, the plate-shaped non-metallic substrate is selected from the group consisting of natural mica platelets, synthetic mica platelets, glass platelets, SiO2 platelets, Al2O3 platelets. Further preferably, the plate-shaped non-metallic substrate is selected from the group consisting of natural mica platelets, synthetic mica platelets, glass platelets. Natural and synthetic mica platelets are particularly preferred as plate-shaped non-metallic substrate, natural mica platelets are quite particularly preferred.

According to the invention, the plate-shaped non-metallic substrate is provided with at least one copper-containing coating.

By a copper-containing coating is meant according to the invention a coating made of pure copper, copper alloys, copper mixtures and/or copper-containing compounds, such as for example copper salts, copper oxides, copper hydroxides and/or copper oxychlorides. Of course, the copper-containing coating can also comprise mixtures of the above-named components.

The copper-containing coating can be selected from the group consisting of copper(0), copper(I) oxide, copper(I) hydroxide, copper(II) oxide (CAS No. 1317-38-0), copper (II) hydroxide (CAS No. 20427-59-2), copper(I) chloride (CAS No. 7758-89-6), copper(II) chloride (CAS No. 7447-39-4), copper(I) bromide, copper(II) bromide, copper(I) iodide, copper(II) acetate, copper(II) acetate monohydrate (CAS No. 6046-93-1), copper(II) hydroxide carbonate (CAS No. 12069-69-1), copper(II) citrate (CAS No. 866-82-0), copper(II) nitrate (CAS No. 3251-23-8), copper(II) sulfate pentahydrate (CAS No. 7758-99-8), copper(I) sulfide, copper (II) sulfide, copper thiocyanate, copper oxychloride (CAS No. 1332-65-6), copper(II) tartrate (CAS No. 815-82-7) and mixtures thereof.

Preferably, the copper-containing coating is selected from the group consisting of copper(0), copper(I) oxide, copper(II) oxide, copper(II) nitrate, copper thiocyanate, copper sulfate, copper oxychloride and mixtures thereof.

In a particularly preferred embodiment, the copper-containing coating comprises copper oxychloride, which can be allocated to mineralogically different crystal systems, space groups and crystal classes.

If the copper oxychloride crystallizes on the plate-shaped non-metallic substrate to be coated in an orthorhombic crystal structure, the mineral atacamite is referred to. If a monoclinic crystal structure is present, botallackite or clinoatacamite can be present depending on the space group. In the case of triclinic crystal structure, anatacamite is referred to. As a rule, the copper oxychloride on the plate-shaped non-metallic substrate to be coated not only forms a crystal lattice, but a mixture of different crystal systems is to be identified via a crystal structure analysis. Corresponding copper-containing coatings need not necessarily be present in crystalline form. Instead, they can be present in partially crystalline or also amorphous form.

In a further preferred embodiment, the copper-containing coating comprises a compound of general empirical formula (I)

$$Cu_wM_x(OH)_yCl_z \cdot nH_2O \qquad (I)$$

wherein M can stand for zinc, nickel, magnesium, cobalt or iron, w can be selected from a range of from 0.5 to 5, x from a range of from 0 to 2, y from a range of from 1 to 8 and z from a range of from 1 to 2, provided that (y+z)=(w·oxidation state of Cu+x·oxidation state of M). n can stand for a value between 0 and 10.

If M stands for magnesium in the above empirical formula (I), for example haydeeite $Cu_3Mg(OH)_6Cl_2$ can be present. According to a preferred variant, the at least one copper-containing coating is present as haydeeite.

If zinc is used for M in the above empirical formula (I), herbertsmithite $Cu_3Zn(OH)_6Cl_2$ or paratacamite $Cu_{1.5}Zn_{0.5}(OH)_3Cl$ is referred to depending on the stoichiometry. Haydeeite, herbertsmithite and paratacamite all have a trigonal crystal structure. In this embodiment, the copper-containing coating can also be present in partially crystalline or also amorphous form.

According to a further preferred variant, the at least one copper-containing coating is present as herbertsmithite.

According to a further preferred variant, the at least one copper-containing coating is present as paratacamite.

According to the invention, mixtures of different ones of the above-named crystal structures can also be present in the copper-containing coating.

In a particularly preferred embodiment, the copper-containing coating comprises copper oxychloride and at least one further compound according to Formula I.

The plate-shaped non-metallic substrate is at least partially covered with at least one copper-containing coating. However, depending on the coating, a complete coverage of the surface can also be present.

According to a preferred development of the invention, the copper-containing coating envelops the plate-shaped non-metallic substrate completely.

The effect pigment according to the invention has a copper content from a range from 3 to 70 wt.-%, preferably from a range of from 11 to 64 wt.-%, further preferably from a range of from 15 to 45 wt.-%, particularly preferably from a range of from 18 to 43 wt.-% and quite particularly preferably from a range of from 20 to 40 wt.-%, in each case relative to the total weight of the effect pigment.

The copper content of the effect pigment according to the invention is determined via iodometric titration.

The specific copper surface area of the effect pigment, defined as the quotient of copper content [wt.-%] and specific surface area according to BET [m²/g],

gives the ratio of the pigment surface area to the level of fouling-inhibiting coating. It allows conclusions to be drawn regarding the release of the copper ions with an identical amount of pigment and identical fouling-inhibiting coating. The higher the value for the specific copper surface area is, the greater the release of copper ions is with an identical amount of pigment.

The smaller the value, the "more environmentally friendly" corresponding pigments are, as a maximum of surface area is present with a low copper content.

The effect pigment according to the invention has a specific copper surface area smaller than 60 wt.-%·g·m$^{-2}$, but preferably smaller than 50 wt.-%·g·m$^{-2}$, further preferably smaller than or equal to 30 wt.-%·g·m$^{-2}$ and quite particularly preferably smaller than or equal to 15 wt.-%·g·m$^{-2}$.

The effect pigment according to the invention preferably has a $D_{50}$ value from a range of from 5.5 to 100 μm, preferably from a range of from 6 to 90 μm, particularly preferably from a range of from 7 to 85 μm, still further preferably from a range of from 8 to 60 μm and quite particularly preferably from a range of from 10 to 45 μm.

The effect pigment according to the invention has a chloride content of more than 0.1 wt.-%, but at least more than 0.2 wt.-% and quite particularly preferably more than or equal to 0.5 wt.-%, in each case relative to the total weight of the pigment.

By the average particle size $D_{50}$ is meant within the framework of this invention the $D_{50}$ value of the cumulative frequency distribution of the volume-averaged size distribution function, as obtained by laser diffraction methods. The $D_{50}$ value indicates that 50% of the effect pigments have a diameter which is equal to or smaller than the indicated value. The average particle size $D_{50}$ of the effect pigments according to the invention was measured using a device from Quantachrome (Cilas 1064) in accordance with the manufacturer's instructions.

The aspect ratio of the effect pigments according to the invention is preferably in a range of from 5 to 2000, further preferably in a range of from 10 to 1500, particularly preferably in a range of from 11 to 1000 and quite particularly preferably in a range of from 5 to 500.

The average thickness of the effect pigments according to the invention is preferably in a range of from 50 to 5000 nm, further preferably in a range of from 60 to 2000 nm, particularly preferably in a range of from 70 to 1000 nm and quite particularly preferably in a range of from 80 to 800 nm.

The average thickness of the effect pigments according to the invention is determined via the spread value. Should this not be possible due to the too-high specific weight of the effect pigment, then the average thickness is determined using scanning electron microscopy of polished sections.

According to a further preferred embodiment, the copper-containing coating is applied wet-chemically to the plate-shaped non-metallic substrate, with the result that an enveloping coating with the copper-containing material is guaranteed.

According to a further preferred embodiment, the wet-chemically coated effect pigment according to the invention is optionally dried and/or optionally calcined. The drying of the effect pigments according to the invention takes place in the case of copper(0)- as well as copper(I)-containing coatings preferably under inert gas atmosphere. The calcining takes place where appropriate in the absence of air and/or under reducing conditions in the presence of e.g. hydrogen, preferably at a temperature of from 250 to 800° C., further preferably from 350 to 600° C. It has transpired that a reliable drying of the copper-containing layer takes place through the calcining, whereby the kinetics of the discharge of copper ions into the anti-fouling coating are optimized. It has been shown that the copper ions from a calcined effect pigment according to the invention are slowed down, but are discharged into the surrounding water to an extent sufficient for the purposes of the invention.

To improve their properties in terms of application technology, the effect pigments according to the invention can be provided with a surface modification which makes it easier for them to be incorporated into an anti-fouling coating for example or influences the floating behavior of the effect pigments.

According to a preferred development of the invention, the pigment surface of the effect pigment is surface-modified organic-chemically.

For the surface modification, for example at least one silane can be applied to the copper-containing coating. The silanes can be alkyl silanes having branched or unbranched alkyl radicals with 1 to 24 C atoms.

The silanes can, however, also be organofunctional silanes, which make possible a chemical binding to a plastic, a binder of a varnish or a paint, etc. These organofunctional groups can also be called coupling groups or functional binding groups and are preferably selected from the group which consists of hydroxy, amino, acryl, methacryl, vinyl, epoxy, isocyanate, cyano and mixtures thereof.

The organofunctional silanes, preferably used as surface-modifying agents, which have suitable functional groups are available commercially and are produced for example by Evonik and sold under the trade name "Dynasylan". Further products can be obtained from Momentive (Silquest silanes) or from Wacker, for example standard and α-silanes from the GENIOSIL product group.

Examples of these are 3-methacryloxypropyltrimethoxysilane (Dynasylan MEMO, Silquest A-174NT), vinyltri(m)ethoxysilane (Dynasylan VTMO and VTEO respectively, Silquest A-151 and A-171 respectively), methyltri(m)ethoxysilane (Dynasylan MTMS and MTES respectively), 3-mercaptopropyltrimethoxysilane (Dynasylan MTMO; Silquest A-189), 3-glycidoxypropyltrimethoxysilane (Dynasylan GLYMO, Silquest A-187), tris[3-(trimethoxysilyl)propyl] isocyanurate (Silquest Y-11597), bis[3-(triethoxysilyl)propyl)]tetrasulfide (Silquest A-1289), bis[3-(triethoxysilyl)propyldisulfide (Silquest A-1589), beta-(3,4-epoxycyclohexyl) ethyltrimethoxysilane (Silquest A-186), bis(triethoxysilyl) ethane (Silquest Y-9805), gamma-isocyanatopropyltrimethoxysilane (Silquest A-Link 35, GENIOSIL GF40), methacryloxymethyltri(m)ethoxysilane (GENIOSIL XL 33, XL 36), (methacryloxymethyl)(m)ethyldimethoxysilane (GENIOSIL XL 32, XL 34), (isocyanatomethyl)methyldimethoxysilane, (isocyanatomethyl)trimethoxysilane, 3-(triethoxysilyl)propylsuccinic anhydride (GENIOSIL GF 20), (methacryloxymethyl)methyldiethoxysilane, 2-acryloxyethylmethyl-dimethoxysilane, 2-methacryloxyethyltrimethoxysilane, 3-acryloxypropylmethyldimethoxysilane, 2-acryloxyethyltrimethoxysilane, 2-methacryloxyethyltriethoxysilane, 3-acryloxypropyltrimethoxysilane, 3-acryloxypropyltripropoxysilane, 3-methacryloxypropyltriethoxysilane, 3-methacryloxypropyltriacetoxysilane, 3-methacryloxypropylmethyldimethoxysilane, vinyltrichlorosilane, vinyltrimethoxysilane (GENIOSIL XL 10), vinyltris(2-methoxyethoxy)silane (GENIOSIL GF 58), vinyltriacetoxysilane or mixtures thereof.

Preferably, 3-methacryloxypropyltrimethoxysilane (Dynasylan MEMO, Silquest A-174NT), vinyltri(m)ethoxysilane (Dynasylan VTMO and VTEO respectively, Silquest A-151 and A-171 respectively), methyltri(m)ethoxysilane (Dynasylan MTMS and MTES respectively), beta-(3,4-epoxycyclohexyl)ethyltrimethoxysilane (Silquest A-186), bis (triethoxysilyl)ethane (Silquest Y-9805), gamma-isocyanatopropyltrimethoxysilane (Silquest A-Link 35, GENIOSIL GF40), methacryloxymethyltri(m)ethoxysilane (GENIOSIL XL 33, XL 36), (methacryloxymethyl)(m)ethyldimethoxysilane (GENIOSIL XL 32, XL 34), 3-(triethoxysilyl)propylsuccinic anhydride (GENIOSIL GF 20), vinyltrimethoxysilane (GENIOSIL XL 10) and/or vinyltris(2-methoxyethoxy) silane (GENIOSIL GF 58) are used as organofunctional silanes.

However, it is also possible to apply other organofunctional silanes to the effect pigments according to the invention.

Furthermore, aqueous pre-hydrolysates, for example commercially available from Degussa, can be used. These include, inter alia, aqueous aminosiloxane (Dynasylan Hydrosil 1151), aqueous amino/alkyl functional siloxane (Dynasylan Hydrosil 2627 or 2909), aqueous diamino functional siloxane (Dynasylan Hydrosil 2776), aqueous epoxy functional siloxane (Dynasylan Hydrosil 2926), amino/alkyl functional oligosiloxane (Dynasylan 1146), vinyl/alkyl functional oligosiloxane (Dynasylan 6598), oligomeric vinylsilane (Dynasylan 6490) or oligomeric short-chain alkyl functional silane (Dynasylan 9896).

In a preferred embodiment, the organofunctional silane mixture contains, in addition to at least one silane without a functional binding group, at least one amino functional silane.

The amino function is a functional group which can enter into one or more chemical interactions with most groups present in binders. This can include a covalent bond, such as e.g. with isocyanate or carboxylate functions of the binder, or hydrogen bridge bonds such as with OH or COOR functions or also ionic interactions. An amino function is therefore very well-suited to the purpose of chemically binding the pigment to various binders.

The following compounds are preferably used for this: 3-aminopropyltrimethoxysilane (Dynasylan AMMO;

Silquest A-1110), 3-aminopropyltriethoxysilane (Dynasylan AMEO), [3-(2-aminoethyl)aminopropyl]trimethoxysilane (Dynasylan DAMO, Silquest A-1120), [3-(2-aminoethyl) aminopropyl]triethoxysilane, triamino functional trimethoxysilane (Silquest A-1130), bis-(gamma-trimethoxysilylpropyl)amine (Silquest A-1170), N-ethyl-gamma-aminoisobutyltrimethoxysilane (Silquest A-Link 15), N-phenyl-gamma-aminopropyltrimethoxysilane (Silquest Y-9669), 4-amino-3,3-dimethylbutyltrimethoxysilane (Silquest A-1637), N-cyclohexylaminomethylmethyldiethoxysilane (GENIOSIL XL 924), N-cyclohexylaminomethyltriethoxysilane (GENIOSIL XL 926), N-phenylaminomethyltrimethoxysilane (GENIOSIL XL 973) or mixtures thereof.

In a furthermore preferred embodiment, the silane without a functional binding group is an alkyl silane. The alkyl silane preferably has the formula $R_{(4-z)}Si(X)_z$. Here, z is an integer from 1 to 3, R is a substituted or unsubstituted, unbranched or branched alkyl chain with 10 to 22 C atoms, and X stands for a halogen and/or alkoxy group. Alkyl silanes having alkyl chains with at least 12 C atoms are preferred. R can also be bonded cyclically to Si, wherein in this case z is usually 2.

In addition to the mentioned silanes and silane mixtures, further organic-chemical modifying agents, such as for example substituted or unsubstituted alkyl radicals, polyethers, thioethers, siloxanes, etc. and mixtures thereof, can also be arranged at or on the surface of the effect pigments according to the invention.

Further surface-modifying agents can be constituted for example by saturated fatty acids such as formic acid, acetic acid, propionic acid, butyric acid, valeric acid, caproic acid, enanthic acid, caprylic acid, pelargonic acid, capric acid, lauric acid, pentadecanoic acid, margaric acid, stearic acid, nonadecanoic acid, arachidic acid, behenic acid, lignoceric acid, cerotic acid, montanic acid, melissic acid or mixtures thereof. Likewise, unsaturated fatty acids such as undecylenic acid, myristoleic acid, palmitoleic acid, petroselinic acid, oleic acid, elaidic acid, vaccenic acid, gadoleic acid, eicosenic acid, cetoleic acid, erucic acid, nervonic acid as well as mixtures thereof can be used for the surface modification of the effect pigments according to the invention. Polysaturated fatty acids such as linoleic acid, alpha-linolenic acid, gamma-linolenic acid, calendula acid, punicic acid, alpha-eleostearic acid, beta-eleostearic acid, arachidonic acid, timnodonic acid, clupanodonic acid, cervonic acid, mixtures thereof, as well as functionalized fatty acids such as vernolic acid or also ricinoleic acid are also suitable as surface-modifying agents. Furthermore, different phosphonic acids, sulfonic acids or also dicarboxylic acids can be used. Of course, the above-named surface-modifying agents based on saturated or unsaturated fatty acids as well as phosphonic, sulfonic or dicarboxylic acids can also be used as a mixture.

However, inorganic-chemical modifying agents (e.g. $Al_2O_3$ or $ZrO_2$ or mixtures thereof) which can increase e.g. the dispersibility and/or compatibility in the respective application medium can also be applied to the pigment surface.

Via the surface modification it is possible to modify and/or set, for example, the hydrophilic properties or hydrophobicity of the pigment surface. For example, via the surface modification it is possible to modify and/or set the leafing or non-leafing properties of the effect pigments according to the invention. By leafing is meant that in an application medium, for example a varnish, the pigments according to the invention arrange themselves at or near the interface or surface of the application medium.

The surface-modifying agents can also have reactive chemical groups, such as for example acrylate, methacrylate, vinyl, isocyanate, cyano, epoxy, hydroxy, amino groups or mixtures thereof. These chemically reactive groups make possible a chemical binding, in particular the formation of covalent bonds, to the application medium or components of the application medium, such as for example binders. For example, the chemical and/or physical properties of cured varnishes or paints, such as e.g. resistance to environmental influences such as moisture, solar radiation, UV resistance, etc. or to mechanical influences, for example scratches, etc., can hereby be improved.

The chemical reaction between the chemically-reactive groups and the application medium or components of the application medium can be induced for example by irradiation with energy, for example in the form of UV radiation and/or heat.

By an anti-fouling coating are meant surface coatings or paints which counteract or prevent the fouling of surfaces.

If for example a ship's hull is fouled by undesired fouling, its coating can be damaged, with the result that corrosion, a color change and a change in the electrical conductivity are promoted. Moreover, the frictional resistance, and thus the fuel consumption, of a ship increases due to the fouling. A damaged coating has to be renewed, i.e. the ship has to be taken out of the water and is no longer available. Furthermore, due to undesired fouling, organisms can be spread into areas in which they do not naturally reside (Review (Progress in Organic Coatings 50 (2004) 75-104)).

Whether and how strongly e.g. a ship's hull is covered by fouling organisms depends among other things on the flow rate at the surface, on the incidence of colonizing organisms, for example in dock, and their growth conditions. Warm tropical waters provide better growth conditions for fouling organisms than for example cold waters. In addition, the salt content of the water is a factor not to be disregarded in the colonization by fouling organisms. While only single-cell organisms occur in the fouling in fresh water (microfouling), the fouling increases as the salt content increases and higher organisms such as barnacles increasingly also occur in the fouling ("Vorstudie" $2^{nd}$ part p. 3).

The chemical fouling protection is based on the fact that active ingredients are released from the anti-fouling coating and are present in the thin layer of water directly on the ship's hull in concentrations which stop the stages of fouling organisms capable of settling from colonizing. The colonization takes place only at very low speeds, but essentially when the ship is stopped. In order to achieve a correspondingly high concentration here, the paint must have a sufficiently high washout and release rate ("leaching rate") in respect of the active ingredients. However, the release must not be too fast, as otherwise the lifetime of the paint decreases on the one hand, but on the other hand an unnecessarily large amount of biocide is also released into the environment. The greatest release takes place at full speed. Long wait times and stopping in tropical waters are the most important fouling-promoting factors (Vorstudie, p. 5).

Anti-fouling coatings which make possible an individual adaptation of the at least one biocide to e.g. water to be traveled, idle times and traveling speed of a ship are desirable. However, for the release of biocides from anti-fouling coatings, the interaction of all individual components of the coating and not just the properties of the at least one biocide used in each case is decisive ("Vorstudie" $2^{nd}$ part p. 6).

As a rule, broad-spectrum biocides which have a strong toxic effect for practically all living organisms have to be used in anti-fouling coatings; a selective fight against the organisms would only result in this space being occupied by others ("Vorstudie" $2^{nd}$ part p. 3).

The biocide mostly used in conventional anti-fouling systems is currently copper, both as metal powder and in different compounds. In order to intensify the toxicity of the copper and that of the entire formulation, further biocides are added to most products. The most common co-biocides in conventional anti-fouling products are zinc, zinc pyrithione, dithiocarbamates, s-triazines, methyl ureas and isothiazolinones ("Umweltbundesamt" p. 29).

Copper is an essential trace element and thus is indispensable for all living organisms. In higher concentrations, however, damaging effects are shown. The concentration range in which neither deficiency symptoms occur nor damaging effects are to be observed can be very small ("Vorstudie" $2^{nd}$ part p. 11).

Copper occurs predominantly in complexed form in the aquatic environment and its bioavailability is decisively controlled by parameters such as pH, level of dissolved organic carbon, hardness and salinity. It is assumed that the amount of bioavailable ions is smaller if the proportion of dissolved organic carbon is higher. The differences in the toxicity from the particle size of the copper were examined in mice, to which copper particles of different sizes were administered in their food. Although this study is not directly transferable to aquatic organisms, it provides data on the size, the specific surface area and particle proportion per gram of the different copper particles which correlate directly to the toxicity. It transpired that the smallest particle size had the strongest toxicity. In aquatic organisms, the free copper ions above all are relevant for the toxic effects, as they can come into contact with the cell surface or penetrate into the cell ("Umweltbundesamt" pp. 53-54).

In anti-fouling coatings, a distinction is drawn between biocide-containing and biocide-free coatings. The biocide-containing anti-fouling coatings include the so-called "self-polishing copolymer" (SPC), "controlled depletion polymer" (CDP), "contact leaching" and "hybrid SPC" coatings. Biocide-free anti-fouling coatings, so-called "foul release" systems, attempt to inhibit the fouling via surface modifications. Whether a ship's hull is now provided for example with a biocide-free or a biocide-containing anti-fouling coating or whether the ship's hull contains areas both with a biocide-free and with a biocide-containing anti-fouling coating can depend on a wide variety of factors, such as e.g. the field of use or traveling speed of the ship. In commercially available anti-fouling coatings copper(I) oxide is mainly used as biocide. As copper(I) oxide, however, cannot inhibit all types of fouling, additional biocides are preferably added to an anti-fouling coating. Copper(I) oxide does not act e.g. against algae growth; here so-called "booster" biocides that inhibit photosynthesis, such as e.g. zinc or copper pyrithione, have to be used. The mode of operation of biocide-containing anti-fouling coatings is based on the controlled release of biocides into the surrounding seawater. The biocide release can take place, depending on the anti-fouling coating used, by diffusion processes, hydrolysis or ion exchange. Colophony-based anti-fouling coatings can allow the seawater to penetrate into the coating and release the biocide in a diffusion process. In colophony-based anti-fouling coatings, a distinction is drawn between coatings with high and coatings with low colophony content. Anti-fouling coatings with a high colophony content are softer than those with a low colophony content. They disintegrate slowly in seawater and are called "soluble matrix" or "controlled depletion polymer" (CDP) anti-fouling coatings. This can be controlled depending on the colophony resin modification and the remaining constituents of the anti-fouling coating. CDP anti-fouling coatings are only partially water-soluble. When the water-soluble components have disintegrated, the so-called "leached layer" remains behind, which delays the biocide release over time. Before the anti-fouling coating is renewed, this layer should be completely removed. A low colophony content requires hard "insoluble matrix" or "contact leaching" anti-fouling coatings which have no self-polishing properties. Both "contact leaching" and "CDP" anti-fouling coatings display exponentially decreasing biocide-release rates.

"Self-polishing copolymer" (SPC) coatings comprise copper or zinc acrylates which react with salt water by hydrolysis or ion exchange and thus guarantee the release of the biocide used.

Anti-fouling coatings are usually complex formulations and as a rule consist of a mixture of from 20 to 30 individual components, among others binders, pigments, excipients and fillers, solvents and additives, such as e.g. UV absorbers, thixotropic agents or wetting agents.

As typical constituents for binders for CDP anti-fouling coatings colophony resins and modified colophony resins are to be named, for SPC anti-fouling coatings copper or zinc acrylates are to be named and for hybrid SPC anti-fouling coatings mixtures of the already named binders are to be named. In the named anti-fouling coatings, e.g. titanium dioxide, carbon black, phthalocyanine blue, talc, zinc oxide, barium sulfate, natural mica or kaolin can be used as pigments, excipients and fillers. Popular solvents of anti-fouling coatings are for example xylene, methyl isobutyl ketone, butanol or white spirit. Furthermore, additives, such as e.g. UV absorbers from the Tinuvin product series from BASF, Ludwigshafen, Germany, wetting and dispersion additives from the Disperbyk product series from Byk-Chemie, Wesel, Germany, thixotropic agents such as Thixatrol ST from Elementis Specialties, Hightstown, N.J., USA, or pyrogenic silicas such as Aerosils from Evonik, Essen, Germany, can be added.

Surprisingly, the replacement of approximately spherical copper(I) oxide by the pearlescent pigment according to the invention in anti-fouling coatings provided herewith displayed comparable or better fouling-inhibiting properties. The fouling of surfaces in seawater was divided into five stages by Rathsack. These stages describe the chronological order of the fouling. The effectiveness of a chemical fouling protection can be assessed according to what stage the fouling stops at.

The five stages of colonization according to Rathsack are:
primary slime from bacteria and a few types of diatoms (stage 1)
occurrence of the green alga Ulothrix (stage 2)
appearance of macro-organisms such as the green alga Enteromorpha and of the sedentary stage of the Tubularia (hydroid) polyp (stage 3)
this is followed by mass colonization with barnacles (Balanidae) or also with the brown alga Ectocarpus (stage 4)
finally, red algae, sensitive green algae, further brown algae as well as moss animals (bryozoa), mussels (bivalvia), tubeworms (sedentaria) and sea squirts (ascidiacea) occur (stage 5).

Stages 1 and 2 are classified by Rathsack as "absolutely acceptable" and "acceptable" respectively. Stage 3, i.e. the occurrence of multi-cell organisms, is understood as an indication of a lack of fouling protection. Stages 4 and 5 indicate "inadequate" and "useless" fouling protection respectively (Vorstudie $2^{nd}$ part p. 2).

If the effect pigments according to the invention have been incorporated into an anti-fouling coating and arranged in biologically active fresh water (river: Pegnitz, Güntersthal (Hartenstein), Germany), it becomes clear that the overall visual impression after one year is much better than that of a commercially available anti-fouling coating. Because of the plate-shaped structure and the thus higher barrier effect of the effect pigments according to the invention, a stronger debonding of the anti-fouling coating from the substrate than for example when approximately spherical copper oxide is used was able to be prevented. As a result, settlement by fouling (green algae) is then also less pronounced.

Anti-fouling coatings comprising the effect pigments according to the invention which have been arranged in biologically active salt water (sea: the Singapore Strait) showed that the fouling-inhibiting effect of the effect pigments according to the invention is also to be observed in seawater. A monthly evaluation showed a comparable or better fouling-inhibiting property than with commercially available anti-fouling coatings.

In an embodiment of the invention, the effect pigment according to the invention is used together with at least one further biocide in anti-fouling coatings. Preferably, zinc pyrithione is used as co-biocide.

Unlike approximately spherical particles consisting exclusively of copper(I) or copper(II) oxide, the effect pigments according to the invention based on a plate-shaped non-metallic substrate are characterized by an excellent, simultaneously acting barrier effect in anti-fouling coatings. The path of the water penetrating into an anti-fouling coating, for example through undesired damage to the coating, is made more difficult by the plate-shaped effect pigments according to the invention.

Spherical particles cannot guarantee such an effective barrier protection. Approximately spherical copper(I) or copper(II) oxide particles with a biocide effect can sediment and accumulate for example on the seabed after their release from anti-fouling coatings.

The situation is different with the effect pigments according to the invention. In the ideal case, these are dissolved out of the anti-fouling coating only after complete disintegration of the copper-containing coating, with the result that only the non-toxic substrate sediments on the seabed here. Advantageously, the layer structure and/or the composition of an anti-fouling coating is adapted to the respective circumstances such that the copper-containing coating of the effect pigment according to the invention is completely consumed first before the non-toxic substrate is dissolved out of the anti-fouling coating and sediments on the seabed.

Because of the plate-shaped geometry of the effect pigments according to the invention, their size does not change substantially during the disintegration process of the copper-containing coating, in contrast to spherical and solid copper-containing particles.

With spherical particles, there is the great disadvantage that the circumference of the spherical particles decreases significantly during the disintegration and the spherical particles then fall out of the matrix of the anti-fouling coating. The same applies to solid copper-containing platelets. Therefore, a large part of the copper or of the copper compounds cannot serve to protect, for example a ship's hull, against fouling, but is lost and contaminates the water.

The effect pigments according to the invention have a copper-containing consumable layer. Before the copper-containing consumable layer disintegrates or is consumed, the effect pigment according to the invention does not dissolve out of the anti-fouling layer, because of its size. After the copper-containing consumable layer has disintegrated, where appropriate the environmentally harmless plate-shaped substrate falls out of the matrix of the anti-fouling layer, without resulting in a contamination of the water. As the plate-shaped non-metallic substrate has a minimum size that cannot be reduced by water, the plate-shaped substrate does not necessarily fall out of the matrix into which the effect pigments according to the invention are embedded. The effect pigment according to the invention thus also at least partially imparts a barrier effect after the copper-containing consumable layer has disintegrated.

The terms copper-containing coating and copper-containing consumable layer are used interchangeably.

A further advantage of the use of the effect pigment according to the invention is that, unlike a spherical particle, the surface remains almost constant during the disintegration process. Therefore, the effect pigment according to the invention allows largely constant kinetics to be set in respect of the release of copper ions. With spherical particles or solid copper-containing platelets, a reduction of the surface area results with the disintegration, which is why a constant release of copper ions is not possible. In respect of the provision of an anti-fouling coating with largely defined copper-ion release and duration of use, the present invention is far superior to conventional spherical copper particles or solid copper platelets.

An anti-fouling coating according to the invention therefore brings about a, preferably long-lasting, barrier effect and the necessary bringing of the copper-containing layer of the effect pigment according to the invention into contact with surrounding seawater.

In order for the fouling-inhibiting properties of the effect pigments according to the invention to come to fruition, they must have seawater wash around them in order to be able to release copper ions from the copper-containing coating. The effect pigments according to the invention embedded in an anti-fouling coating continuously have seawater wash around them, with the result that copper ions are always released from the copper-containing coating and for example preserve the ship's hull from a colonization. At the same time, too fast a penetration of the seawater into the anti-fouling coating is prevented by the plate-shaped structure of the effect pigment according to the invention.

In addition to the barrier effect of the effect pigments according to the invention, coated plate-shaped non-metallic substrates provide further advantages over spherical particles, such as for example the fact that the chemical composition and/or thickness of the substrate coating can be selected according to the requirements of the respective anti-fouling coating. In the case of anti-fouling coatings which expose the effect pigments according to the invention at their surface very quickly e.g. by abrasion, for example a pigment according to the invention with a very small copper-containing coverage can be desired. At the same time, a pigment which is characterized by a high effectiveness against fouling organisms can be selected through the type of substrate coating. This unique combination of plate-shaped non-metallic substrate, which is mainly responsible for the barrier effect, and fouling-inhibiting substrate coating, which can be selected depending on the requirements of the respective anti-fouling coating, makes the use of the corresponding effect pigments in anti-fouling coatings, in addition to the above-named advantages, very attractive.

Furthermore, the effect pigments according to the invention have the typical properties of conventional pearlescent pigments, i.e. transparency and, depending on the copper-containing coating, deep gloss. An anti-fouling coating containing the effect pigments according to the invention need not necessarily have the color shade of the pigment, but can be present in the paint of the desired paintwork of the ship. This is interesting in particular in the sailing or yachting field, where a red-brown or dark anti-fouling paint is not necessarily desired, but rather light paints are preferred. The effect pigments according to the invention can be present in anti-fouling coatings mixed with further color and/or effect pigments and thus give the optical appearance of for example a ship's paintwork a much more attractive design. This can be interesting in particular for the parts of the ship that sometimes also lie above the waterline.

Just on cost grounds alone, as long as possible a service life of the anti-fouling coating is to be guaranteed. For one thing, the fouling-inhibiting layer is to act over as long as possible a period and is to prevent a ship from increasing in weight through fouling. For another thing, a renewal of the anti-fouling coating is to become necessary as infrequently as possible, in order to avoid cost-intensive idle times of a ship. An anti-fouling coating that is effective over several years is therefore desirable. However, a range of other factors play a role in this, in addition to the pigment used in the anti-fouling coating and optionally a further component acting as biocide. To name but a few, the type of anti-fouling coating, the traveling speed of a ship, the idle times, the temperature and composition of the seawater are to be mentioned here. These factors, named only by way of example, show that an anti-fouling coating should be adaptable for the respective intended use.

The copper-coated, plate-shaped substrates according to the invention represent a more environmentally friendly alternative to particles consisting exclusively of elemental copper, copper(I) or copper(II) oxide. The effect pigments according to the invention thus make an important contribution to an environmentally friendly anti-fouling coating.

The so-called oil absorption value can be used as a parameter for determining the level of pigmentation in an identical varnish system. The oil absorption value indicates the amount of oil in grams which is used in order to process 100 g of pigment to form a consistent, putty-like material. The effect pigments according to the invention have a higher oil absorption value compared with approximately spherical copper(I) oxide particles and can therefore be used at a lower level of pigmentation, without their fouling-inhibiting properties being impaired.

The layer thickness of the anti-fouling coating of self-polishing systems such as SPC or CDP decreases continually, with the result that approximately spherical pigments are not completely dissolved. With anti-fouling coatings comprising the effect pigments according to the invention, the pigment thickness is much smaller because of the plate-shaped substrate. Thus the copper-containing coating of the effect pigment according to the invention is advantageously depleted more quickly as a rule than the film shrinkage of the anti-fouling coating. An unnecessary contamination by a copper-containing coating that is not needed is thus slight, as preferably only the biologically harmless substrate is released from the anti-fouling coating into the sea.

The plate-shaped structure of the effect pigment according to the invention has a much larger surface area compared with approximately spherical copper oxide particles. A higher fouling-inhibiting active surface area per effect pigment according to the invention is associated with this. This has the result that a lower level of pigmentation, i.e. lower concentration of effect pigment according to the invention, in anti-fouling coatings has a comparable or better fouling-inhibiting property than would be possible with approximately spherical copper oxide particles. In conventional anti-fouling coatings, 30 to 50 wt.-%, relative to the total weight of the anti-fouling coating, of approximately spherical copper oxide particles must be used in order to have a sufficient fouling-inhibiting coating. Through the use of the effect pigments according to the invention, the level of pigmentation, i.e. the pigment content in the anti-fouling coating, can be reduced to 10 to 20 wt.-%, relative to the total weight of the anti-fouling coating.

Therefore the present invention surprisingly makes it possible to reduce the proportion of fouling-inhibiting component to be added to an anti-fouling coating by a factor of from 10 to 1.5, if a spherical copper-containing pigment is replaced with an effect pigment according to the invention, wherein however the protection against fouling is preserved or preferably improved.

The effect pigments according to the invention have a copper-containing coating. This copper-containing coating can be adapted, according to chemical composition and amount, individually to the needs of the respective anti-fouling coating, i.e. an unnecessarily large amount of copper-containing compound in an anti-fouling coating can be avoided. Only after the copper-containing coating applied to the non-metallic plate-shaped substrate has been dissolved completely, is the substrate optionally dissolved out of the anti-fouling coating, with the result that in the end only a non-toxic substrate enters the sea environment.

Although an anti-fouling coating which comprises the effect pigments according to the invention contains a much smaller amount of copper-containing compound, a comparable fouling-inhibiting effect is achieved to that achieved with conventional anti-fouling coatings. A possible cause of the excellent fouling-inhibiting effect when the effect pigments according to the invention are used in anti-fouling coatings could be that ideally only the substrate of the pearlescent pigments is dissolved out of the anti-fouling coating.

A further advantage of the effect pigments according to the invention is that the copper content can be set via the proportion of copper-containing coating and thus a fouling-inhibiting component that can be adapted to the respective use is present in an anti-fouling coating. Therefore no additional $SiO_2$ layer, as described in EP 0 677 989 B1, is necessary in order to control the release of copper ions.

According to a further preferred embodiment of the invention, the effect pigments according to the invention do not have a metal oxide coating over the copper-containing coating. Therefore the copper-containing coating, apart from any organic-chemical surface modification, is the outermost inorganic layer of the effect pigment according to the invention.

In a further embodiment, the present invention thus relates to effect pigments consisting of synthetic or natural mica platelets and at least one copper-containing coating of or with copper oxychloride, wherein the average particle size $D_{50}$ of the effect pigment is more than 5 μm, the copper content of the effect pigment is in a range of from 3 to 70 wt.-%, relative to the total weight of the effect pigment, and the specific copper surface area of the effect pigment, defined as the quotient of copper content [wt.-%] and specific surface area according to BET [m²/g], $$\frac{\text{copper content[wt.}-\%]}{BET\left[\frac{m^2}{g}\right]}$$

is smaller than 60 wt.-%·g·m$^{-2}$ and wherein the copper-containing coating can optionally be surface-modified.

In a further embodiment, the present invention relates to effect pigments consisting of non-metallic plate-shaped substrates and at least one copper-containing coating which is optionally covered with a surface modification, wherein the chloride content of the effect pigments is >0.1 wt.-%, preferably >0.3 wt.-%, particularly preferably >1.0 wt.-% and quite particularly preferably >2.0 wt.-%, in each case relative to the total weight of the effect pigment.

In a further embodiment, the present invention relates to effect pigments consisting of synthetic or natural mica platelets and at least one copper-containing coating of or with copper oxychloride as well as optionally a surface modification, wherein the chloride content of the effect pigments is >1.0 wt.-%, preferably >2 wt.-%, in each case relative to the total weight of the effect pigments.

In a further embodiment, the invention relates to effect pigments consisting of a non-metallic plate-shaped substrate and at least one copper-containing coating of general empirical formula (I), wherein the copper-containing coating is surface-modified.

In a further embodiment, the invention relates to effect pigments consisting of synthetic or natural mica platelets and a copper-containing coating with or of metallic copper, with or of copper(I) oxide/hydroxide, with or of copper(II) oxide/hydroxide or mixtures thereof.

Of course, an anti-fouling coating comprising the effect pigments according to the invention can be applied not only to ships of all kinds, but to any surfaces which can come into contact with fresh, salt or brackish water, such as e.g. buoys, fishing nets, ladders, bridges, cranes, oil rigs, tide gates, sluices, offshore wind turbines or jetties.

The effect pigments according to the invention can, however, also be used in many further applications, which are to be listed below only by way of example: plastics which are to have an antibacterial or fungicidal effect, light switches, wall paints, stair rails, coatings, powder coatings, textiles, films, packaging films and greenhouse films, wood preservation, printing inks, roofing tiles, enamels.

In a further embodiment, the present invention relates to the use of an effect pigment according to the invention in a wall paint.

In a further embodiment, the present invention relates to a wall paint which comprises an effect pigment according to the invention.

The following examples are to describe the present invention in more detail without limiting it. All percentages are to be understood as percent by weight.

I Production of Effect Pigments Comprising a Plate-Shaped Non-Metallic Substrate and a Copper-Containing Coating Example 1

300 g muscovite mica with a particle-size distribution according to a MALVERN Mastersizer 2000: $D_{10}$=18 µm, $D_{50}$=38 µm, $D_{90}$=70 µm was suspended in 4000 ml DM water (DM=demineralized) and heated to 60° C. accompanied by stirring. The pH was raised to 10 with 5 wt.-% NaOH solution and the suspension was stirred for 15 min. 1500 ml of a 12 wt.-% copper chloride solution was then metered out into the suspension. The pH was kept constant at pH 10 by counteraction with a lye. The end of the metering was followed by stirring for 200 min and filtering, and the filter cake was washed with DM water (demineralized water). The filter cake was dried in the absence of air at 50° C.

The obtained effect pigment had a reddish brown color shade and a particle-size distribution (Cilas 1064) of $D_{10}$=22 µm, $D_{50}$=44 µm and $D_{90}$=75 µm. The copper content of this effect pigment was 24 wt.-%, relative to the total weight of the effect pigment. The copper-containing coating was present predominantly in amorphous form and allowed no banding analysis via RDF (X-ray structural analysis).

Example 2

Part of the effect pigment from Example 1 was calcined in the absence of oxygen at 400° C. for 3 h in a rotary kiln and then stored under inert gas atmosphere. The obtained effect pigment had a reddish brown color shade and a particle-size distribution (Cilas 1064) of $D_{10}$=21 µm, $D_{50}$=42 µm and $D_{90}$=69 µm. The copper content of this effect pigment was 24 wt.-%, relative to the total weight of the effect pigment. The main constituent of the copper-containing coating consisted of copper(II) oxide (CuO). In addition, a proportion of copper (I) oxide could also be detected.

Example 3

Part of the effect pigment from Example 1 was calcined under reducing conditions at 400° C. for 3 h in a rotary kiln and then stored under inert gas atmosphere.

The obtained effect pigment had a reddish color shade and a particle-size distribution (Cilas 1064) of $D_{10}$=19 µm, $D_{50}$=39 µm and $D_{90}$=77 µm. The copper content of this effect pigment was 25 wt.-%, relative to the total weight of the effect pigment. The main constituent of the copper-containing coating consisted of metallic copper. In addition, a proportion of copper(II) oxide could also be detected.

Example 4

300 g muscovite mica with a particle-size distribution according to a MALVERN Mastersizer 2000: $D_{10}$=18 µm, $D_{50}$=38 µm, $D_{90}$=70 µm was suspended in 4000 ml DM water and heated to 90° C. accompanied by stirring. The pH was raised to 9.0 with 5 wt.-% NaOH solution and the suspension was stirred for 15 min. 1650 ml of a 20 wt.-% copper chloride solution was then metered out into the suspension. The pH was kept constant at pH 9.0 by counteraction with a lye. The end of the metering was followed by stirring for 300 min and filtering, and the filter cake was washed with DM water. The filter cake was dried at 50° C.

The obtained effect pigment had a dark brown color shade and a particle-size distribution (Cilas 1064) of $D_{10}$=18 µm, $D_{50}$=40 µm and $D_{90}$=79 µm. The copper content of this effect pigment was 24 wt.-%, relative to the total weight of the effect pigment. The copper-containing coating was present predominantly in amorphous form and allowed no banding analysis via RDF.

Example 5

Part of the effect pigment from Example 4 was calcined at 400° C. for 3 h in a rotary kiln.

The obtained effect pigment had a black color shade and a particle-size distribution (Cilas 1064) of $D_{10}$=19 µm, $D_{50}$=40 µm and $D_{90}$=66 µm. The copper content of this effect pigment was 29 wt.-%, relative to the total weight of the effect pigment. The main constituent of the copper-containing coating consisted of copper(II) oxide (CuO). In addition, a small proportion of copper oxychloride could also be detected.

Example 6

555 g of a 21 wt.-% copper chloride solution was placed in a 3-l flat-flange reaction vessel and 2000 g of an 18 wt.-% alkaline Rochelle salt solution was added accompanied by stirring. Then, accompanied by stirring, 100 g muscovite mica with a particle-size distribution according to a MALVERN Mastersizer 2000: $D_{10}=18$ µm, $D_{50}=38$ µm, $D_{90}=70$ µm was added in portions and the suspension was heated to 60° C. At this temperature, 70 g D-(+)-glucose, dissolved in 230 ml DM water, was added. After the reaction had ended, the suspension was filtered off and washed with DM water until neutral.

The thus-obtained filter cake was dried at 50° C. in the absence of air in a drying oven and the resulting effect pigment was stored under inert gas atmosphere.

The obtained effect pigment had a red color shade and a particle-size distribution (Cilas 1064) of $D_{10}=20$ µm, $D_{50}=42$ µm and $D_{90}=81$ µm. The copper content of this effect pigment was 30 wt.-%, relative to the total weight of the effect pigment. The main constituent of the copper-containing coating consisted of metallic copper. In addition, a proportion of copper(II) oxide could also be detected.

Example 7

300 g muscovite mica with a particle-size distribution according to a MALVERN Mastersizer 2000: $D_{10}=18$ µm, $D_{50}=38$ µm, $D_{90}=70$ µm was suspended in 4000 ml DM water and heated to 60° C. accompanied by stirring. The pH was set to 7.5 with 5 wt.-% hydrochloric acid solution and the suspension was stirred for 60 min. 1500 ml of a 12 wt.-% copper chloride solution was then metered out into the suspension. The pH was kept constant at pH 7.5 by counteraction with a corresponding lye. The end of the metering was followed by stirring for 200 min and filtering, and the filter cake was washed with DM water. The filter cake was dried in the absence of air at 50° C.

The obtained effect pigment had a pale green color shade and a particle-size distribution (Cilas 1064) of $D_{10}=7$ µm, $D_{50}=45$ µm and $D_{90}=88$ µm. The copper content of this effect pigment was 23 wt.-%, relative to the total weight of the effect pigment. The main constituent of the copper-containing coating consisted of copper oxychloride.

Example 8

100 g muscovite mica with a particle-size distribution according to a MALVERN Mastersizer 2000: $D_{10}=18$ µm, $D_{50}=38$ µm, $D_{90}=70$ µm was suspended in 1200 ml DM water and heated to 60° C. accompanied by stirring. The pH was set to 8.5 with 5 wt.-% NaOH solution and the suspension was stirred for 15 min. 600 ml of a 10 wt.-% copper chloride solution, to which 0.3 mol $ZnCl_2$ had been added, was then metered out into the suspension. The pH was kept constant at pH 8.5 by counteraction with a corresponding lye. The end of the metering was followed by stirring for 200 min and filtering, and the filter cake was washed with DM water. The filter cake was dried in the absence of air at 150° C.

The obtained effect pigment had a bluish color shade and a particle-size distribution (Cilas 1064) of $D_{10}=6$ µm, $D_{50}=43$ µm and $D_{90}=87$ µm. The copper content and the zinc oxide content of this effect pigment were 19 wt.-% and 12 wt.-% respectively, in each case relative to the total weight of the effect pigment. The main constituent of the copper-containing coating could be detected as zinc-containing copper oxychloride, wherein the zinc oxide content (ZnO) according to XRF (X-ray fluorescence) analysis was 11.5 wt.-%.

Example 9

50 g of the effect pigment from Example 7 was pasted by hand with 10 g of a 10 wt.-% solution of oleic acid in ethyl acetate and homogenized well. The resulting paste was dried at 80° C. in a vacuum drying oven.

Comparison Example 1

100 g effect pigment from Example 2 was suspended in 1500 ml DM water and heated to 60° C. accompanied by stirring. The pH of the suspension was raised to 7.5 with 5 wt.-% NaOH solution and stirring was carried out for 15 min. A water glass solution (76.5 g water glass solution, 20 wt.-% $SiO_2$, mixed with 104 g DM water) was then introduced slowly into the suspension and the pH was kept constant at pH 7.5.

This was followed by stirring for another 15 min and filtering, and the filter cake was washed with DM water. The filter cake was dried at 130° C. under inert gas atmosphere, and stored in the absence of air.

The obtained effect pigment had a reddish brown color shade and a particle-size distribution (Cilas 1064) of $D_{10}=20$ µm, $D_{50}=42$ µm and $D_{90}=81$ µm. The copper content of this effect pigment was 21 wt.-%, relative to the total weight of the effect pigment.

Comparison Example 2

Dicopper oxide with a copper content of 88 wt.-%, relative to the total weight of the pigment, and a particle-size distribution (Cilas 1064) of $D_{10}=1.1$ µm, $D_{50}=4.0$ µm and $D_{90}=6.6$ µm (from Spiess Urania, Hamburg).

Comparison Example 3

Metallic copper pigment STANDART Resist LT (from Eckart GmbH, Guntersthal) with a copper content of 94 wt.-%, relative to the total weight of the pigment, and with a particle-size distribution (Cilas 1064) of $D_{10}=19$ µm, $D_{50}=45$ µm and $D_{90}=82$ µm.

Comparison Example 4

Metallic copper pigment STANDART L 900 (from Eckart GmbH, Guntersthal) with a copper content of 99 wt.-%, relative to the total weight of the pigment, and a particle-size distribution (Cilas 1064) of $D_{10}=19$ µm, $D_{50}=40$ µm and $D_{90}=72$ µm.

Comparison Example 5

Oxidatively dyed gold bronze pigment STANDART E900 (from Eckart GmbH, Guntersthal) with a copper content of 96 wt.-%, relative to the total weight of the pigment, and a particle-size distribution (Cilas 1064) of $D_{10}=8$ µm, $D_{50}=19$ µm and $D_{90}=35$ µm.

II Characterization of the Effect Pigments

IIA Particle Size Measurement

The size distribution curve of the effect pigments according to the invention and that of the pigments of the comparison examples were measured using a device from Quantachrome (Cilas 1064) in accordance with the manufacturer's instructions. For this, approx. 1.5 g of the respective pigment was suspended in 100 ml isopropanol, treated for 300 seconds in an ultrasound bath and then placed by means of a Pasteur pipette into the sample preparation cell of the measuring device and measured several times. The average values were formed from the individual measurement results. The scattered light signals were evaluated according to the Fraunhofer method.

The size distribution curve of the plate-shaped non-metallic substrates was determined using a device from Malvern (Mastersizer 2000) in accordance with the manufacturer's instructions. For this, approx. 0.1 g of the corresponding substrate as aqueous suspension, without addition of dispersion auxiliaries, was placed by means of a Pasteur pipette into the sample preparation cell of the measuring device, accompanied by constant stirring, and measured several times. The average values were formed from the individual measurement results. The scattered light signals were evaluated according to the Fraunhofer method.

By the average particle size $D_{50}$ is meant within the framework of this invention the $D_{50}$ value of the cumulative frequency distribution of the volume-averaged size distribution function, as obtained by laser diffraction methods. The $D_{50}$ value indicates that 50% of the effect pigments or of the plate-shaped non-metallic substrates have a diameter which is equal to or smaller than the indicated value, for example 20 μm. Correspondingly, the $D_{90}$ value indicates that 90% of the effect pigments or of the plate-shaped non-metallic substrates have a diameter which is equal to or smaller than the respective value. Furthermore, the $D_{10}$ value indicates that 10% of the effect pigments or of the plate-shaped non-metallic substrates have a diameter which is equal to or smaller than the respective value.

IIb Scanning Electron Microscope Photographs

The average thickness of the effect pigments according to the invention and of the pigments of the comparison examples was determined via scanning electron microscope photographs using a Supra 35 scanning electron microscope (from Zeiss). For this, a resin that is usual in electron microscopy, for example TEMPFIX (Gerhard Neubauer Chemikalien), was applied to a sample plate and heated on a hot plate until it softened. The sample plate was then taken off the hot plate and the respective pigment was scattered onto the softened resin. After the resin had cooled, the respective pigments were fixed almost perpendicularly in the resin. During the scanning electron measurement, the azimuthal angle α of the pigments fixed in the resin relative to a plane normal to the surface was estimated and taken into account during the thickness evaluation according to $h = h_{meas}/\cos \alpha$. To determine the average thickness h at least 100 pigment particles of the effect pigments according to the invention or of the pigments of the comparison examples were used. If, because of the weight of the effect pigments according to the invention, their average thickness h cannot be determined via the spreading value method, the average thickness h was determined using scanning electron photographs.

IIc Spreading Value/Aspect Ratio

The spreading value method has long been known for determining the thickness of plate-shaped effect pigments. DIN 55923 gives instructions for measuring the level of water coverage (spreading) of "leafing" pigments. Based on this, the effect pigments according to the invention and pigments of the comparison examples were dispersed in a 10% stearic acid solution in isopropanol and stirred for 15 min. They were then separated from the solution by filtration and dried. By this procedure stearic acid is adsorbed on the respective pigments, which gives them "leafing" properties.

A defined weighed portion of pigments treated in this way in a volatile organic solvent was then placed on a water surface in a tank. The pigments spread on the water surface and formed a film. They were distributed to form a uniform unbroken film by stirring with a glass rod. Then the film was compressed by two rulers until it had first folds. The film was then relaxed again until the folds disappeared. The surface area covered by the film was measured and indicated as spreading value in cm²/g (or also in m²/g) on the basis of the weighed portion of the pigment. In this method, it is assumed that the pigments arrange themselves individually next to each other at least in the center in the film and therefore pigments are present in a single "monolayer".

TABLE 1

Spreading values and aspect ratios of the examples and comparison examples

| Example/Comparison example | Spreading value [cm²/g] | Aspect ratio |
|---|---|---|
| Example 1 | 6400 | 85 |
| Example 2 | 6200 | 78 |
| Example 3 | 7700 | 90 |
| Example 4 | 9900 | 119 |
| Example 5 | 9800 | 118 |
| Example 6 | 5100 | 64 |
| Example 7 | 5700 | 77 |
| Example 8 | 6300 | 81 |
| Comparison example 2 | 3300 | 8 |

On the basis of this spreading value, the average thickness h in nm of the pigments is calculated according to the following formula:

$$h = \frac{10^7 \,(\text{nm/cm})}{\rho(\text{g/cm}^3) * \text{spreading value}(\text{cm}^2/\text{g})}$$

wherein ρ is the physical true density of the pigment adsorbed with stearic acid. The density was determined here using a helium pycnometer (Multipycnometer, from Quantachrome). The measurement is suitable for the precise density determination of powders as well as of porous and irregularly shaped solids. Here, the loss of pressure of a helium reference volume was determined and from this a conclusion was drawn as to the volume of the sample. This was put in relation to the respective weight of the weighed portion. The density is dependent on the copper content of the respective pigment. For Example 7 the density of 3.0 g/cm² was determined experimentally. This value was used as the basis for the calculation of the average thickness and the aspect ratio of all effect pigments according to the invention. For the calculation of the aspect ratio of comparison example 2 a density of 6.0 g/cm² was used as the basis.

The aspect ratio is defined as the ratio of the average particle size $D_{50}$ to the average thickness h.

IId Determination of the Specific Surface Area According to BET

To determine the specific surface area according to BET (device: BELsorp mini II, from BEL), the effect pigments according to the invention and the pigments of the comparison examples were baked at 300° C. for 2 h and then supplied to the determination, which took place by means of liquid nitrogen.

IIe Determination of the Copper Content

The iodometric determination of the copper content of the effect pigments according to the invention and the pigments of the comparison examples was carried out by titration. Alternatively, the copper content can also be determined using X-ray fluorescence (XRF) analysis. However, the copper content was preferably determined by titration.

IIf Oil Absorption Value

The oil absorption value indicates the amount of oil in grams which is used in order to process 100 g of pigment to form a consistent, putty-like material. This amount of oil depends strongly on the manner in which the oil is incorporated. The scatter range of the test results is therefore very large. The values are only comparable when they have been determined as soon after each other as possible by the same examiner according to the same method. To determine the oil absorption value, approx. 2-5 g pigment (weighed out precisely) was pasted accompanied by the addition of a measured-out quantity of linseed oil on a glass plate with a spatula and linseed oil was added from a burette until a homogeneous, consistent, putty-like material formed. This paste should be able to be distributed only just without cracking or crumbling and only just adhere to the plate. It was calculated how many grams of linseed oil (density 0.93 g/m$^3$) are needed for 100 g of pigment.

| Example/Comparison example | Oil absorption value |
|---|---|
| Example 4 | 100 |
| Example 7 | 90 |
| Example 8 | 90 |
| Example 9 | 70 |
| Comparison example 2 | 15 |

A comparison of the oil absorption values showed that the effect pigments according to the invention had a much higher oil absorption value than the approximately spherical pigment from comparison example 2. By an additional surface coverage, as in Example 9, the oil absorption value could be greatly reduced, which makes a higher pigment volume concentration in the varnish possible.

IIg X-Ray Fluorescence (XRF) Analysis

The metal oxide content, in particular the zinc oxide content, and the chloride content of the effect pigments according to the invention as well as of the pigments of the comparison examples were determined by means of X-ray fluorescence (XRF) analysis.

For this, the respective pigment was incorporated into a lithium tetraborate glass tablet, fixed in solid sample measuring vessels and measured therefrom. The Advantix ARL device from Thermo Scientific was used as measuring device.

TABLE 2

Copper content, specific copper surface area, chloride content of the pigments of the examples and comparison examples

| Example/Comparison example | Copper content [wt.-%] | Specific copper surface area [wt.-% · g · m$^2$] | Chloride content [wt.-%] |
|---|---|---|---|
| Example 1 | 24 | 6 | 1.2 |
| Example 2 | 24 | 8 | |
| Example 3 | 25 | 7 | |
| Example 4 | 24 | 3 | 4.2 |
| Example 5 | 29 | 7 | |
| Example 6 | 30 | 16 | 50 ppm |
| Example 7 | 23 | 6 | 4.4 |
| Example 8 | 19 | 5 | 6.3 |
| Comparison example 2 | 88 | 125 | 0.2 |
| Comparison example 3 | 94 | 174 | — |
| Comparison example 4 | 99 | 152 | <0.01 |
| Comparison example 5 | 24 | 68 | — |

IIh X-Ray Structural Analysis (RDF)

The chemical composition of the coating of the effect pigments according to the invention was determined by means of X-ray structural analysis.

III Opacity/Determination of the Opacity Quotient

The opacity of the effect pigments according to the invention and the pigments of the comparison examples was determined on the basis of varnish applications on black-white opacity charts (Byko Chart 2853, from Byk Gardner, Geretsried, Germany). The respective pigment was stirred into a conventional nitrocellulose varnish (Dr. Renger Erco bronzing mixed varnish 2615e; from Morton) at a level of pigmentation of 10 wt.-% (relative to the total weight of the wet varnish). The respective pigment was provided and then dispersed in the varnish with a brush. The completed varnish was applied with a wet-film thickness of 36 μm to black-white opacity charts on a doctor-blade drawdown device.

The lightness values L* were measured with a measurement geometry of 110°, relative to the angle of emergence of the light irradiated at 45°, on the basis of these coatings applied to the black background and to the white background of the black-white opacity chart, using a BYK-mac device, from Byk Gardner.

By formation of the opacity quotient Dq it is possible to determine measured values for the opacity of the pigments that are independent of the substrate. For this, the quotient of the lightness values on the black background to the lightness values on the white background of the black-white opacity chart is calculated:

If identical varnish systems are used, the opacity quotient allows the opacity of different effect pigments to be compared with one another.

The closer the value of the opacity quotient Dq approaches to 1, the more opaque the corresponding pigment appears to an observer, at an identical level of pigmentation in wt.-%.

TABLE 3

Opacity quotient of the pigments from the examples/comparison examples

| Example/Comparison example | Opacity quotient (10% pigment in NC varnish) $L_{110(black)}/L_{110(white)}$ |
|---|---|
| Example 1 | 0.49 |
| Example 2 | 0.47 |
| Example 6 | 0.41 |
| Example 7 | 0.51 |
| Example 8 | 0.51 |
| Comparison example 3 | 0.73 |
| Comparison example 4 | 0.77 |
| Comparison example 5 | 0.97 |

It can be seen from Table 2 that the effect pigments according to the invention are much more transparent than conventional copper or copper alloy pigments (comparison examples 3, 4 and 5).

IIj Gloss Measurements

The gloss is a measure of the directed reflection and can be characterized precisely using a Micro-Tri-Gloss device. More strongly scattering samples should have a low gloss because of the increased edge scattering and pigment unevennesses.

The varnish applications on black-white opacity charts were measured using a Micro-Tri-Gloss gloss measuring device, from Byk Gardner, at a measurement angle of 60° relative to the vertical. The respective pigments were stirred into a conventional nitrocellulose varnish (Dr. Renger Erco bronzing mixed varnish 2615e; from Morton, level of pigmentation 10 wt.-%, relative to the total weight of the nitrocellulose varnish). The completed varnish was applied with a wet-film thickness of 36 μm to black-white opacity charts (Byko-Chart 2853, from Byk-Gardner) using a doctor-blade drawdown device.

TABLE 4

Gloss values of the pigments of the examples and comparison examples, measured at 60° on the black background of the black-white opacity chart

| Example/Comparison example | Gloss 60° |
| --- | --- |
| Example 1 | 15.8 |
| Example 2 | 23.3 |
| Example 3 | 27.2 |
| Example 4 | 28.5 |
| Example 5 | 23.1 |
| Example 6 | 18.5 |
| Example 7 | 5.4 |
| Example 8 | 5.2 |
| Comparison example 3 | 72.8 |
| Comparison example 4 | 77.5 |
| Comparison example 5 | 37.4 |

Compared with copper or copper alloy pigments of the comparison examples, the effect pigments according to the invention have much lower gloss values. These effect pigments thus do not occur as gloss pigment when applied. The user is hereby given the possibility of providing matte color shades in a wide variety of shades, in particular even in light shades.

IIk Color Shade Constancy

To determine the color shade constancy, the pigments were incorporated in the colophony resin-based anti-fouling coating according to application-specific example 1 instead of the pigment according to Example 1 used there. The level of pigmentation in Table 5 is given in wt.-%, relative to the total weight of the anti-fouling coating.

The obtained pigmented anti-fouling coating was applied with a wet-film thickness of 200 μm to aluminum sheets by means of an HVLP spray gun (Sata Jet 3000, from Sata). After storage for one week at 20° C. and a relative atmospheric humidity of 65%, a surface of 20 cm² was continuously loaded with a 5 wt.-% NaCl solution at a temperature of 50° C. over a period of 1 week.

After the test had ended, color measurements of both the unloaded surface and the loaded surface were carried out using a Byk-mac device (from Byk Gardner). The difference in color shade between the two measured surfaces is represented in Table 5 as ΔL* at different angles, wherein the unloaded surface was used as reference.

TABLE 5

Difference in color shade ΔL*

| Anti-fouling coating | Pigment/Level of pigmentation | ΔL* 15° | ΔL* 25° | ΔL* 45° | ΔL* 75° | ΔL* 110° |
| --- | --- | --- | --- | --- | --- | --- |
| Application-specific example 1 | Example 1/20 wt.-% | −5.9 | 3.0 | 3.2 | 3.8 | 4.0 |
| Application-specific example 1 | Example 2/20 wt.-% | 4.5 | 4.9 | 5.5 | 6.2 | 6.6 |
| Application-specific example 1 | Example 5/20 wt.-% | 5.9 | 5.1 | 4.6 | 5.1 | 5.1 |
| Application-specific example 1 | Example 8/20 wt.-% | 0.5 | −0.8 | −1.8 | −2.4 | −3.4 |
| Sigma Eco Fleet 530 Redbrown1) | — | −9.2 | −3.1 | 5.9 | 8.7 | 9.4 |

1) from Sigma Coatings

III Color Strength

Varnish applications on black-white opacity charts (Byko Chart 2853, from Byk-Gardner) were measured using an X-rite color measurement device, from X-rite, at the measurement angles of 25°, 45°, 75°, on the black background and on the white background. The respective pigments were mixed with a white color paste (Helio Beit UN 101; from Bollig & Kemper) at a level of pigmentation of 23 wt.-%, relative to the total weight of the white color paste. The thus-obtained color paste was stirred into a conventional metal effect base varnish (Mipa mixed varnish; from Mipa, level of pigmentation 33 wt.-%, relative to the total weight of the Mipa mixed varnish). The completed varnish was applied with a wet-film thickness of 100 μm to black-white opacity charts using a doctor-blade drawdown device.

TABLE 6a

Color measurement on white background

| Example/Comparison example | L* 25° | L* 45° | L* 75° |
| --- | --- | --- | --- |
| Example 8 | 96.6 | 94.5 | 94.7 |
| Comparison example 2 | 78.0 | 75.2 | 75.8 |
| Helio Beit UN 101 | 96.9 | 95.8 | 96.1 |

TABLE 6b

Color measurement on black background

| Example/Comparison example | L* 25° | L* 45° | L* 75° |
| --- | --- | --- | --- |
| Example 8 | 93.8 | 91.6 | 91.9 |
| Comparison example 2 | 77.3 | 74.4 | 75.0 |
| Helio Beit UN 101 | 96.3 | 92.3 | 92.7 |

In contrast to the pigment from comparison example 2, it can clearly be seen that the effect pigment according to the invention from Example 8 only slightly influences the color shade of the white color paste.

IIm Determination of the Average Cu Washout Rate According to DIN EN ISO 15181

The aim of the determination is to assess the washout rate of copper ions from anti-fouling coatings. The method according to DIN EN ISO 15181 is used to determine the level of, among other things, copper under defined laboratory conditions and to calculate the washout rate of the copper from the coating.

Test cylinders coated with an anti-fouling coating were dipped, together with reference cylinders, into a reservoir in flowing artificial seawater. At fixed time intervals, the cylinders were removed and exposed to the same artificial seawater over a defined period of time in individual containers to measure the washout rate, before they were returned to the reservoir. The concentration of the biocide which was released into the water of the individual containers to measure the washout rate was then determined. This process was repeated at defined time intervals, with the result that the washout rate of the biocide could be calculated.

The average copper washout rate from day 21 to the last day of the test, in this case until day 45, was calculated according to the following equation:

$$R_{21,45} = \frac{\sum \frac{(R_i - R_j)}{2}(j-i)}{\sum (j-i)}$$

wherein $R_{21,45}$=average copper washout rate from day 21 to day 45 i and j=the time, in days, which has elapsed since the beginning of the test for each pair of successive days of the test, in particular 21 and 45.

$R_i$ and $R_j$=the average copper washout rates for each set of three test cylinders, in $\mu g \cdot cm^{-2} \cdot d^{-1}$ for each pair of successive days of the test. In our case from day (i) 21 to day (j) 45.

The copper concentration in artificial seawater for the respective samples was measured by means of atomic absorption spectrometer (240FS AA, from Agilent Technologies). For this, the obtained sample solutions were acidified with nitric acid and measured.

To determine the average copper washout rate, the respective pigments were incorporated into the colophony resin-based anti-fouling coatings according to application-specific example 1 instead of the pigment according to Example 1 used there. The level of pigmentation in Table 7 is given in wt.-%, relative to the total weight of the anti-fouling coating.

TABLE 7

| Average copper washout rate $R_{21,45}$ | |
|---|---|
| Example/Comparison example/Level of pigmentation | $R_{21,45}[\mu g/cm^2]$ |
| Example 1/20 wt.-% | 16 |
| Example 2/20 wt.-% | 5 |
| Example 3/20 wt.-% | 22 |
| Comparison example 2/20 wt.-% | 19 |
| Sigma ECO Fleet 530 Redbrown | 7 |

Despite the low level of copper-containing coating, the effect pigments according to the invention have a comparable average copper washout rate to that of conventional pigments used in anti-fouling coatings.

IIn Determination of the Leaching Rate in Synthetic Seawater

The leaching rate in synthetic seawater indicates how many copper ions are released to the seawater at 20° C. within 6 h from a suspension of the effect pigment according to the invention. The aim should be to release as small an amount of Cu ions as possible to the seawater, but this amount should still be sufficient as a corresponding biocide to prevent fouling of the respective surface.

For this, artificial seawater was produced according to DIN 50904.

100 g of a 4 wt.-% pigment suspension of the artificial seawater was poured into a 250-ml Duran glass bottle and shaken for 6 h at 250 rpm in a Bühler KM-2 shaker unit. The suspension was then left to sediment for ½ h and then the suspension was filtered off over a blue band filter.

The filtrate was measured using standards adapted by means of an atomic absorption spectrometer (240FS AA, from Agilent Technologies) against a matrix.

TABLE 8

| Leaching rate in artificial seawater | | |
|---|---|---|
| Example/Comparison example | Leaching in seawater Cu [ppm] | BET [$m^2/g$] |
| Example 1 | 10 | 3.9 |
| Example 2 | 10 | 2.9 |
| Example 4 | 6 | 4.0 |
| Example 7 | <1 | 3.8 |
| Example 8 | <1 | 3.8 |
| Comparison example 2 | 16 | 0.7 |
| Comparison example 3 | 73 | 0.5 |
| Comparison example 4 | 44 | 0.7 |
| Comparison example 5 | 45 | 1.4 |

The table clearly shows that the effect pigments according to the invention release much smaller amounts of copper to the seawater than the comparison examples, although the specific surface areas of the comparison examples are larger. At the same time, the respective modification of the applied copper-containing coating can influence the Cu leaching behavior. The Cu release of the pigment can thus be set according to requirements.

III Application-Specific Examples

The copper-containing pigments according to the invention, which were produced according to one of the above examples, were used in the following anti-fouling coatings.

Application-Specific Example 1

Anti-Fouling Coating for the Marine Sector, CDP

| Name | Product name | wt.-% | Manufacturer/ supplier |
|---|---|---|---|
| Colophony resin | Safitack GR WWB | 26.00 | Safic |
| Zinc oxide | Heucophos ZCP Plus | 7.00 | Heubach |
| Talc | Micro Talkum N | 6.60 | Azemuth |
| Titanium dioxide | Finntitan RF 5 | 6.00 | Kemira |
| Pigment according to Example 1 | | 32.00 | |
| Wetting/Dispersing additive | Disperbyk 101 | 1.40 | Byk |
| Co-biocide | Zinc omadine powder | 4.00 | Arch |
| Solvent | Xylene | 11.00 | Merck |
| Solvent | Methyl isobutyl ketone | 6.00 | Merck |

The pigment from Example 1 can be used in a range of from 10.0 to 35.0 wt.-%, relative to the total weight of the anti-fouling coating. The anti-fouling coating can be balanced out to 100 wt.-% with solvent.

The colophony resin was provided and homogenized in a container together with the wetting/dispersing additive. Accompanied by stirring, the components zinc oxide, talc and titanium dioxide were added and dispersed for 15 min at a speed of 14 m/s. This process took place accompanied by constant cooling, in order to prevent the grinding material from heating up too strongly. The pigment from Example 1 was then added together with the co-biocide and the solvents, accompanied by stirring. After an examination of the homogeneity using a doctor-blade drawdown, the anti-fouling coating was poured into a suitable container.

Application-Specific Example 2

Anti-Fouling Coating for Yacht Coatings, CDP

| Name | Product name | wt.-% | Manufacturer/supplier |
|---|---|---|---|
| Colophony resin | Rokrasin 1880 | 33.00 | Rokra |
| Zinc oxide | Heucophos ZCO Plus | 6.00 | Heubach |
| Talc | Finntalc M40 | 5.00 | Mondo |
| Titanium dioxide | Kronos 2044 | 5.00 | Kronos |
| Pigment according to Example 3 | | 28.00 | |
| Wetting/Dispersing additive | Disperbyk P 104 | 2.00 | Byk-Chemie |
| Dichloro octylisothiazolinone | Sea Nine 211 N | 4.00 | Dow |
| Solvent | Xylene | 8.00 | Jäckle |
| Solvent | Methyl isobutyl ketone | 10.00 | Jäckle |

The pigment from Example 3 can be used in a range of from 10.0 to 40.0 wt.-%, relative to the total weight of the anti-fouling coating. The anti-fouling coating can be balanced out to 100 wt.-% with solvent.

The colophony resin was provided and homogenized in a container with the wetting/dispersing additive. Accompanied by stirring, the components zinc oxide, talc and titanium dioxide were added and dispersed for 20 min at 16 m/s. After examination of the grain fineness, the zinc oxide and the dichloro octylisothiazolinone were stirred in at a low rotational speed (3 m/s) and then set to a viscosity of 2.6 Pa·s with xylene and methyl isobutyl ketone. After renewed homogenization, the anti-fouling coating was decanted into a suitable container.

Application-Specific Example 3

Anti-Fouling Coating for the Marine Sector, CDP

| Name | Product name | wt.-% | Manufacturer/supplier |
|---|---|---|---|
| Colophony resin | Foral 85-E | 26.00 | Eastman |
| Zinc oxide | Heucophos ZPZ 09 | 7.00 | Heubach |
| Talc | Mikrotalkum AT extra | 6.60 | Omya |
| Titanium dioxide | Hombitan R 610 K | 6.00 | Sachtleben |
| Pigment according to Example 4 | | 25.00 | |
| Wetting/Dispersing additive | Disperbyk 142 | 1.40 | Byk |
| Solvent | Xylene | 11.00 | Merck |
| Solvent | MIBK | 6.00 | Merck |

The pigment from Example 4 can be used in a range of from 9.00 to 35.0 wt.-%, relative to the total weight of the anti-fouling coating. The anti-fouling coating can be balanced out to 100 wt.-% with solvent.

The colophony resin was provided in a container together with the wetting/dispersing additive. Accompanied by stirring, the components zinc oxide, talc and titanium dioxide were added and dispersed for 15 min at a speed of 14 m/s. This process took place accompanied by constant cooling, in order to prevent the grinding material from heating up too strongly. The pigment from Example 4 was then added together with the co-biocide and the solvents, accompanied by stirring. After an examination of the homogeneity, the anti-fouling coating was poured into a suitable container.

Application-Specific Example 4

Anti-Fouling Coating for the Marine Sector, CDP

| Name | Product name | wt.-% | Manufacturer/supplier |
|---|---|---|---|
| Colophony resin | Rokrasin 1880 | 32.00 | Rokra |
| Zinc oxide | Heucophos ZCP Plus | 5.00 | Heubach |
| Talc | Micro Talkum N | 6.60 | Azemuth |
| Titanium dioxide | Finntitan RF 5 | 6.00 | Kemira |
| Pigment according to Example 7 | | 36.00 | |
| Wetting/Dispersing additive | Disperbyk 101 | 1.40 | Byk |
| Solvent | Xylene | 7.00 | Merck |
| Solvent | Methyl isobutyl ketone | 6.00 | Merck |

The pigment from Example 7 can be used in a range of from 10.0 to 40.0 wt.-%, relative to the total weight of the anti-fouling coating. The anti-fouling coating can be balanced out to 100 wt.-% with solvent.

The colophony resin was provided and homogenized in a container together with the wetting/dispersing additive. Accompanied by stirring, the components zinc oxide, talc and titanium dioxide were added and dispersed for 15 min at a speed of 14 m/s. This process took place accompanied by constant cooling, in order to prevent the grinding material from heating up too strongly. The pigment from Example 7 was then added together with the solvents, accompanied by stirring. After examination of the homogeneity using a doctor-blade drawdown, the anti-fouling coating was poured into a suitable container.

Application-Specific Example 5

Anti-Fouling Coating for the Marine Sector, CDP

| Name | Product name | wt.-% | Manufacturer/supplier |
|---|---|---|---|
| Colophony resin | Safitack GR WWB | 11.00 | Safic |
| Colophony resin | Foral 85-E | 15.00 | Eastman |
| Zinc oxide | Heucophos ZCP Plus | 7.00 | Heubach |
| Talc | Micro Talkum AT extra | 6.60 | Azemuth |
| Titanium dioxide | Kronos 2044 | 6.00 | Kronos |
| Pigment according to Example 8 | | 28.00 | |
| Wetting/Dispersing additive | Disperbyk 101 | 1.40 | Byk |
| Co-biocide | Zinc omadine powder | 4.00 | Dow |
| Dichloro octylisothiazolinone | Sea Nine 211 N | 4.00 | |
| Solvent | Xylene | 11.00 | Merck |
| Solvent | Methyl isobutyl ketone | 6.00 | Merck |

The pigment from Example 8 can be used in a range of from 5.0 to 35.0 wt.-%, relative to the total weight of the anti-fouling coating. The anti-fouling coating can be balanced out to 100 wt.-% with solvent.

The colophony resins were provided and homogenized in a container together with the wetting/dispersing additive. Accompanied by stirring, the components zinc oxide, talc and titanium dioxide were added and dispersed for 15 min at a speed of 14 m/s. This process took place accompanied by constant cooling, in order to prevent the grinding material from heating up too strongly. The pigment from Example 8 was then added together with the co-biocides and the solvents, accompanied by stirring. After examination of the homogeneity using a doctor-blade drawdown, the completed anti-fouling coating was poured into a suitable container.

IV Field Test of the Pigments

IVa Fresh Water

To assess the fouling inhibition of the effect pigments according to the invention and the pigments of the comparison examples in fresh water, the respective pigments were incorporated into a varnish according to IIk Color shade constancy, applied to aluminum sheets and stored. The sheets were then exposed for one year in the biologically active river the Pegnitz in Güntersthal (91235 Hartenstein, Germany) at a depth of 50 cm. After the test phase had ended, the sheets were cleaned manually under running water. The sheets were then assessed visually for fouling and adhesion.

TABLE 9

| Example | Fouling | Adhesion | Overall impression |
|---|---|---|---|
| Example 2 | 1 | 2 | 1 |
| Example 7 | 1 | 1 | 1 |
| Example 8 | 2 | 1 | 2 |
| Sigma Eco Fleet 530 Redbrown | 5 | 5 | 5 |

0 = very good 5 = very poor

IVb Salt Water

To assess the fouling inhibition of the effect pigments according to the invention and the pigments of the comparison examples in salt water, the respective pigments were incorporated into a varnish at a level of pigmentation of 20 wt.-%, relative to the total weight of the anti-fouling coating, according to IIk Color shade constancy, applied to aluminum sheets and stored. The sheets were then exposed for up to one year in the sea off Singapore. In each case two identically varnished and pigmented sheets were stored in the seawater, wherein one of the sheets was exposed to a higher UV load by longer solar irradiation (front side). At the same time, the identically varnished and pigmented sheet was exposed conversely in the seawater (back side). The assessment took place on the basis of ASTM D 3623-78a via a photographic evaluation of the sheets. For this, the sheets were taken out of the seawater and the lower half was rinsed with increasing water pressure. The sheets were digitally captured after each cleaning process and photographically analyzed. In the case of animal settlements, the individual animals were counted.

TABLE 10a

Results after half a year

| | Slime | | | | Algae | | | | Tubeworms | | | |
|---|---|---|---|---|---|---|---|---|---|---|---|---|
| Example | Top | Bottom | 50 psi | 100 psi | Top | Bottom | 50 psi | 100 psi | Top | Bottom | 50 psi | 100 psi |
| Example 4 (front side) | 98 | 98 | 0 | 0 | 1 | 2 | 0 | 0 | 1 | 0 | 0 | 0 |
| Example 7 (front side) | 2 | 4 | 3 | 3 | 94 | 91 | 96 | 44 | 4 | 5 | 0 | 0 |
| Example 7 (back side) | 3 | 4 | 3 | 0 | 96 | 94 | 78 | 0 | 1 | 2 | 5 | 0 |
| Example 8 (front side) | 78 | 74 | 73 | 39 | 11 | 27 | 13 | 10 | 11 | 9 | 5 | 2 |
| Example 8 (back side) | 16 | 37 | 20 | 10 | 84 | 48 | 72 | 17 | 0 | 13 | 8 | 0 |
| Sigma Eco Fleet 530 Redbrown (front side) | 42 | 15 | 20 | 0 | 58 | 75 | 48 | 2 | 0 | 0 | 0 | 0 |

| | Mollusks | | | | Barnacles | | | |
|---|---|---|---|---|---|---|---|---|
| Example | Top | Bottom | 50 psi | 100 psi | Top | Bottom | 50 psi | 100 psi |
| Example 4 (front side) | 0 | 0 | 0 | 0 | 0 | 0 | 0 | 0 |
| Example 7 (front side) | 0 | 0 | 0 | 0 | 0 | 0 | 0 | 0 |
| Example 7 (back side) | | | 0 | 0 | 0 | 0 | 0 | 0 |
| Example 8 (front side) | 0 | 0 | 0 | 0 | 0 | 0 | 0 | 0 |
| Example 8 (back side) | 0 | 0 | 0 | 0 | 0 | 0 | 0 | 0 |
| Sigma Eco Fleet 530 Redbrown (front side) | 0 | 0 | 0 | 0 | 0 | 0 | 0 | 0 |

TABLE 10b

Results after one year

| | Slime | | | | Algae | | | | Tubeworms | | | |
|---|---|---|---|---|---|---|---|---|---|---|---|---|
| Example | Top | Bottom | 50 psi | 100 psi | Top | Bottom | 50 psi | 100 psi | Top | Bottom | 50 psi | 100 psi |
| Example 1 (back side) | 60 | 2 | 1 | 0 | 36 | 98 | 8 | 0 | 2 | 2 | 0 | 0 |
| Example 2 (back side) | 22 | 0 | 1 | 05 | 73 | 91 | 87 | 85 | 2 | 9 | 12 | 15 |
| Example 3 (back side) | 5 | 2 | 2 | 2 | 72 | 67 | 78 | 76 | 21 | 31 | 20 | 22 |
| Example 4 (back side) | 83 | 0 | 0 | 0 | 3 | 82 | 74 | 79 | 8 | 18 | 26 | 21 |
| Sigma Eco Fleet 530 | 12 | 5 | 5 | 0 | 73 | 95 | 93 | 0 | 9 | 0 | 0 | 0 |

TABLE 10b-continued

Results after one year

Redbrown (back side)

| Example | Mollusks | | | | Barnacles | | | |
|---|---|---|---|---|---|---|---|---|
| | Top | Bottom | 50 psi | 100 psi | Top | Bottom | 50 psi | 100 psi |
| Example 1 (back side) | 0 | 0 | 0 | 0 | 2 | 0 | 0 | 0 |
| Example 2 (back side) | 0 | 0 | 0 | 0 | 3 | 0 | 0 | 0 |
| Example 3 (back side) | 0 | 0 | 0 | 0 | 2 | 0 | 0 | 0 |
| Example 4 (back side) | 0 | 0 | 0 | 0 | 4 | 0 | 0 | 0 |
| Sigma Eco Fleet 530 Redbrown (back side) | 0 | 0 | 0 | 0 | 0 | 0 | 0 | 0 |

Anti-fouling coatings pigmented with the effect pigments according to the invention displayed a comparable or even better fouling-inhibiting effect than a commercially available anti-fouling coating. It is to be noted here that the commercially available anti-fouling coating comprises a further co-biocide in addition to spherical copper(I) oxide. The anti-fouling coatings provided with the effect pigments according to the invention contained no co-biocide, which became noticeable in terms of a partially increased slime formation. However, even after a year, no higher organisms were to be found on these sheets. In the photographic evaluation, the visually apparent result after the cleaning process was not always correctly reproduced, which was due to the light/dark contrasts of, for example, damage to the sheet. Partially increasing values after a cleaning process are therefore to be found in the tables above, although the corresponding sheet no longer had any residues.

The invention claimed is:

1. An effect pigment comprising a plate-shaped non-metallic substrate and at least one copper-containing coating, wherein the average particle size $D_{50}$ of the effect pigment is more than 5 μm and the copper content of the effect pigment is in a range of from 3 to 70 wt.-%, relative to the total weight of the effect pigment, and wherein the specific copper surface area of the effect pigment, defined as the quotient of copper content [wt.-%] and specific surface area according to BET [m$^2$/g], $$\frac{\text{copper content[wt.}-\%]}{BET\left[\frac{m^2}{g}\right]}$$

is smaller than 60 wt.-%·g·m$^{-2}$.

2. The effect pigment according to claim 1, wherein the effect pigment has a chloride content of more than 0.1 wt.-%, relative to the total weight of the effect pigment.

3. The effect pigment according to claim 1, wherein the non-metallic plate-shaped substrate is selected from the group consisting of natural mica platelets, synthetic mica platelets, glass platelets, silicon dioxide platelets, aluminum oxide platelets and mixtures thereof.

4. The effect pigment according to claim 1, wherein the at least one copper-containing coating is selected from the group consisting of copper(0), copper(I) oxide, copper(I) hydroxide, copper(II) oxide, copper(II) hydroxide, copper(I) chloride, copper(II) chloride, copper(I) bromide, copper(II) bromide, copper(I) iodide, copper(II) acetate, copper(II) acetate monohydrate, copper(II) hydroxide carbonate, copper(II) citrate, copper(II) nitrate, copper(II) sulfate pentahydrate, copper(I) sulfide, copper(II) sulfide, copper thiocyanate, copper oxychloride, copper(II) tartrate and mixtures thereof.

5. The effect pigment according to claim 1, wherein the copper-containing coating envelops the plate-shaped non-metallic substrate completely.

6. The effect pigment according to claim 1, wherein the copper-containing coating is applied wet-chemically.

7. The effect pigment according to claim 1, wherein the effect pigment is dried and/or calcined in the absence of air.

8. The effect pigment according to claim 1, wherein the pigment surface of the effect pigment is organic-chemically surface-modified.

9. The effect pigment according to claim 1, wherein the average particle size $D_{50}$ of the effect pigment ranges from 5.5 μm to 100 μm.

10. The effect pigment according to claim 1, wherein the pigment surface is organic-chemically modified by the application of at least one silane to the copper-containing coating.

11. The effect pigment according to claim 10, wherein the at least one silane is an alkyl silane and/or organofunctional silane.

12. The effect pigment according to claim 1, wherein the pigment surface is inorganic-chemically modified by the application of $Al_2O_3$, $ZrO_2$ or mixtures thereof.

13. A method for producing the effect pigment according to claim 1,
wherein the method comprises the following steps:
(a1) suspending plate-shaped non-metallic substrate in an aqueous solution,
(b1) adding a copper salt solution and depositing a copper-containing coating on the plate-shaped non-metallic substrate, to obtain the effect pigment,
(c1) filtering, optionally drying and/or optionally calcining the effect pigment obtained according to step (b1) or
wherein the method comprises the following steps:
(a2) bringing an aqueous copper salt solution and a plate-shaped non-metallic substrate into contact, to provide a suspension,
(b2) adding a copper complexing agent to the suspension obtained in step (a2),
(c2) adding a reducing agent to the suspension from step (b2), to obtain the effect pigment,
(d2) filtering, optionally drying and/or optionally calcining the effect pigment obtained according to step (c2).

14. The method according to claim 13, wherein the copper complexing agent is a potassium sodium tartrate solution.

15. A process for producing an effect pigmented anti-fouling coating composition, comprising incorporating an effect pigment according to claim 1 in an anti-fouling coating composition.

16. An anti-fouling coating composition comprising an effect pigment according to claim 1.

17. The anti-fouling coating composition according to claim 16, wherein the coating composition further comprises a co-biocide.

18. An effect pigment comprising a plate-shaped substrate and at least one copper-containing coating,
wherein the average particle size $D_{50}$ of the effect pigment is more than 5 μm and the copper content of the effect pigment is in a range of from 3 to 70 wt.-%, relative to the total weight of the effect pigment, and
wherein the copper-containing coating comprises a compound of general empirical formula (I):

$$Cu_w M_x(OH)_y Cl_z \cdot n H_2O \qquad (I),$$

wherein M can stand for zinc, nickel, magnesium, cobalt or iron, w can be selected from a range of from 0.5 to 5, x from a range of from 0 to 2, y from a range of from 1 to 8, z from a range of from 1 to 2 and n for a value between 0 and 10, provided that (y+z)=(w·oxidation state of Cu+x·oxidation state of M).

19. An effect pigment comprising a plate-shaped non-metallic substrate and at least one copper-containing coating,
wherein the average particle size $D_{50}$ of the effect pigment is more than 5 μm and the copper content of the effect pigment is in a range of from 3 to 70 wt.-%, relative to the total weight of the effect pigment, and
wherein the copper-containing coating comprises paratacamite.

* * * * *

UNITED STATES PATENT AND TRADEMARK OFFICE
CERTIFICATE OF CORRECTION

PATENT NO. : 9,127,165 B2
APPLICATION NO. : 14/397747
DATED : September 8, 2015
INVENTOR(S) : Michael Grüner et al.

It is certified that error appears in the above-identified patent and that said Letters Patent is hereby corrected as shown below:

Title Page, Item (56), Column 2, OTHER PUBLICATIONS, Line 9, delete "invironmentall" and insert -- environmental --

In the Claims

Column 35, Line 6, Claim 18, delete "substrate" and insert -- non-metallic substrate --

Signed and Sealed this
Fifth Day of July, 2016

Michelle K. Lee
*Director of the United States Patent and Trademark Office*